US012520962B2

(12) United States Patent
Playford

(10) Patent No.: US 12,520,962 B2
(45) Date of Patent: Jan. 13, 2026

(54) COFFEE-MAKING APPARATUS AND METHOD

(71) Applicant: GIOCOGUADO LTD., Cambridge (GB)

(72) Inventor: William Playford, Cambridge (GB)

(73) Assignee: GIOCOGUADO LTD., Cambridge (GB)

( * ) Notice: Subject to any disclaimer, the term of this patent is extended or adjusted under 35 U.S.C. 154(b) by 855 days.

(21) Appl. No.: 17/757,429

(22) PCT Filed: Dec. 16, 2020

(86) PCT No.: PCT/GB2020/053235
§ 371 (c)(1),
(2) Date: Jun. 15, 2022

(87) PCT Pub. No.: WO2021/123765
PCT Pub. Date: Jun. 24, 2021

(65) Prior Publication Data
US 2023/0012246 A1 Jan. 12, 2023

(30) Foreign Application Priority Data
Dec. 16, 2019 (GB) ..................................... 1918549

(51) Int. Cl.
*A47J 31/30* (2006.01)
*A47J 31/44* (2006.01)
(52) U.S. Cl.
CPC ......... *A47J 31/303* (2013.01); *A47J 31/4403* (2013.01)

(58) Field of Classification Search
None
See application file for complete search history.

(56) References Cited

U.S. PATENT DOCUMENTS 2,550,902 A 5/1951 Beckelman
3,344,732 A 10/1967 Von Kleydoref et al.
(Continued)

FOREIGN PATENT DOCUMENTS

CH 177917 6/1935
CN 1313065 A 9/2001
(Continued)

OTHER PUBLICATIONS

L. Navarini et al., "Experimental Investigation of Steam Pressure Coffee Extraction in a Stove-top Coffee Maker," Applied Thermal Engineering 29, 5-6 (2010) 998, 31 pages.
(Continued)

*Primary Examiner* — John J Norton
(74) *Attorney, Agent, or Firm* — HSML P.C.

(57) ABSTRACT

A coffee-making apparatus has a brew-water chamber for containing heated brew water, a coffee chamber, a water delivery system for delivering heated brew water from the brew-water chamber to the coffee chamber, and a cooling apparatus for cooling the heated brew water before it reaches the coffee chamber. The water delivery system comprises a conduit and a valve, openable when the pressure at a valve inlet reaches a valve opening pressure, for controlling a flow of brew water into the coffee chamber. The water delivery system is configured to control the flow rate of brew water while the coffee chamber is filling with brew water. A method of making coffee is also provided.

20 Claims, 9 Drawing Sheets

(56) References Cited

U.S. PATENT DOCUMENTS

| | | | |
|---|---|---|---|
| 3,670,641 A | 6/1972 | Mancioli | |
| 4,147,097 A | 4/1979 | Gregg | |
| 4,516,484 A | 5/1985 | De Ponti | |
| 4,660,466 A | 4/1987 | Fries et al. | |
| 5,467,690 A | 11/1995 | Zappala et al. | |
| 2003/0066430 A1 | 4/2003 | Bitar et al. | |
| 2005/0268790 A1 | 12/2005 | Baldacci | |
| 2009/0092728 A1 | 4/2009 | Coccia et al. | |
| 2010/0031826 A1* | 2/2010 | Doglioni Majer | A47J 31/461 99/279 |
| 2010/0098823 A1 | 4/2010 | Nenov et al. | |
| 2014/0037808 A1 | 2/2014 | Rizzuto et al. | |
| 2014/0069279 A1* | 3/2014 | Upston | A47J 31/4403 99/283 |
| 2021/0289980 A1* | 9/2021 | Zhan | A47J 31/38 |

FOREIGN PATENT DOCUMENTS

| | | | | |
|---|---|---|---|---|
| CN | 203378972 U | | 1/2014 | |
| CN | 107405018 A | * | 11/2017 | ............ A47J 31/303 |
| CN | 107495843 A | | 12/2017 | |
| CN | 108024660 A | | 5/2018 | |
| DE | 20318806 U1 | | 4/2004 | |
| DE | 102018202763 A1 | * | 8/2019 | ............ A47J 31/461 |
| EP | 0808597 | | 11/1997 | |
| FR | 1278224 | | 12/1961 | |
| FR | 1472998 | | 3/1967 | |
| FR | 2186209 | | 1/1974 | |
| FR | 2347014 | | 11/1977 | |
| WO | 94/07400 | | 4/1994 | |
| WO | 2012/090091 | | 7/2012 | |
| WO | 2013/032104 | | 3/2013 | |
| WO | 2016/059426 | | 4/2016 | |

OTHER PUBLICATIONS

Office Action issued for European Patent Application No. 15784132. 1, Apr. 11, 2019, 6 pages.
International Preliminary Report on Patentability of PCT/GB2020/ 053235, May 17, 2022, 7 pages.
Office Action issued for Chinese Patent Application No. 202080093653. 2, Mar. 23, 2024, 19 pages.
International Search Report and Written Opinion of PCT/GB2020/ 053235, Apr. 7, 2021, 13 pages.
Search Report issued for British Patent Application No. 1918549.5, Jun. 11, 2020, 5 pages.

* cited by examiner

FIGURE 2A
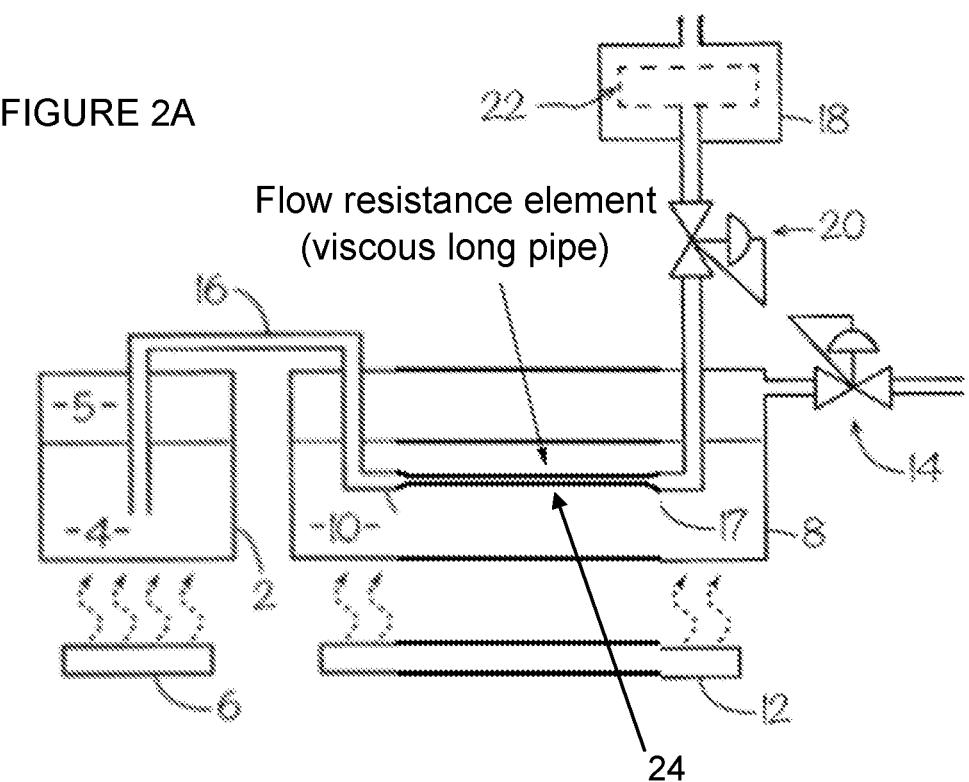
Flow resistance element (viscous long pipe)
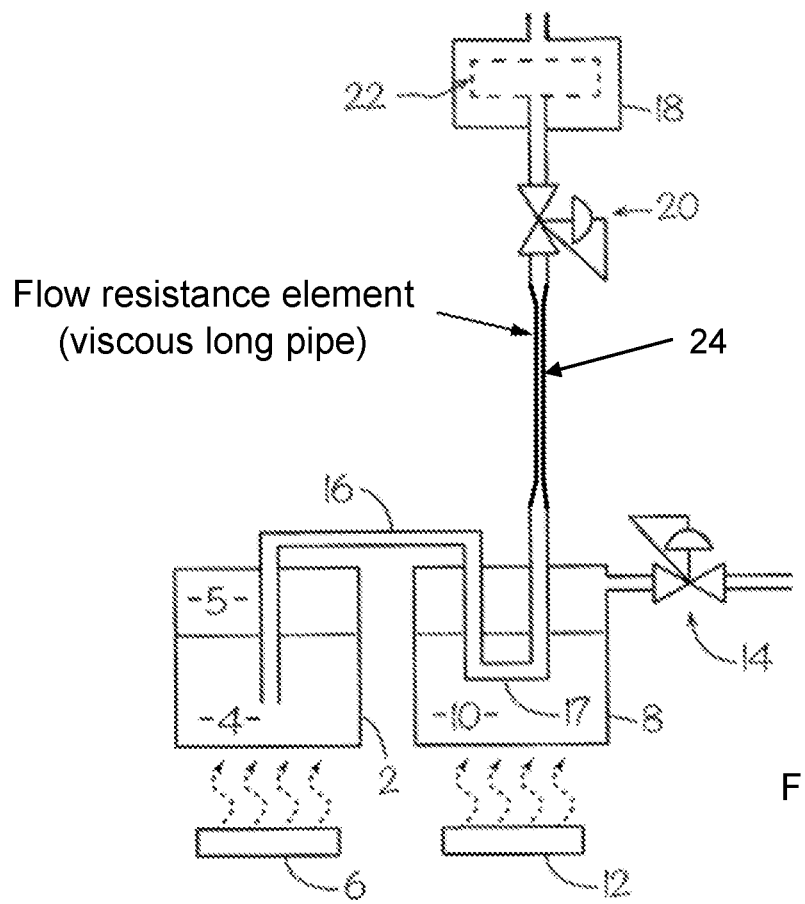
Flow resistance element (viscous long pipe)
FIGURE 2B FIGURE 2C
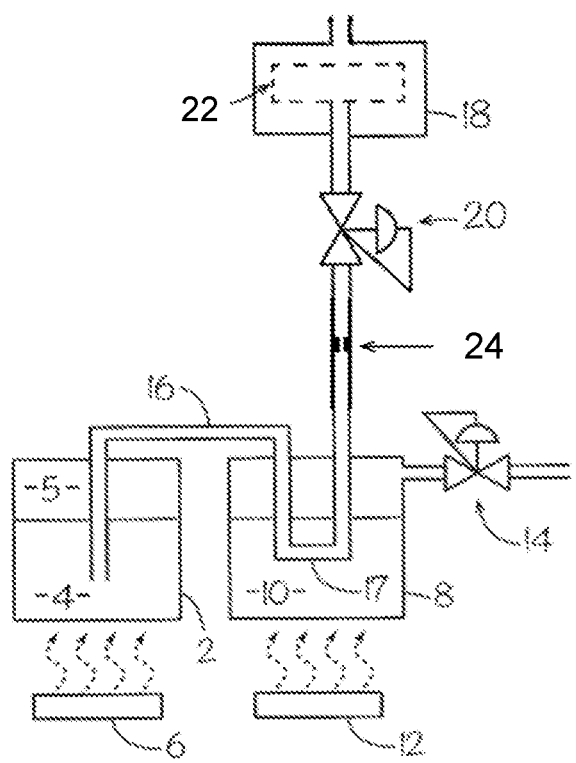
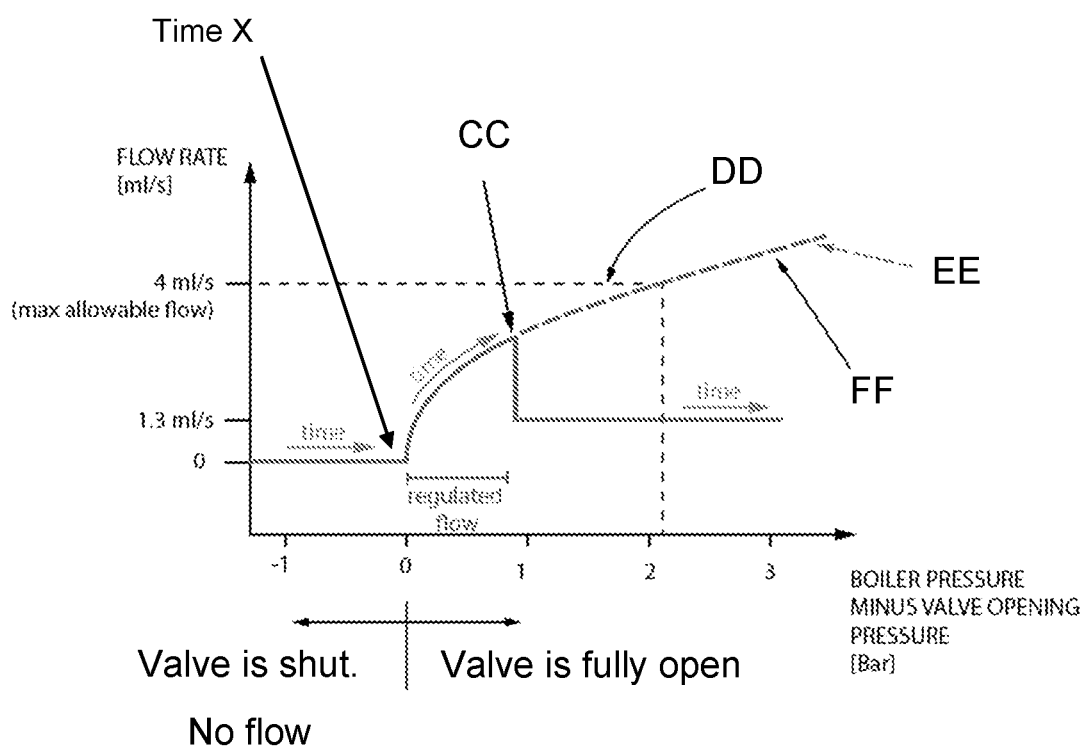
FIGURE 3

CONDUIT A

| | High flow rate condition (max acceptable flow rate) | | Nominal flow rate condition (with ground coffee providing typical flow resistance) | |
|---|---|---|---|---|
| Inputs | Pipe length | 1056 mm | Pipe length | 1056 mm |
| | Pipe inside diameter | 1.35 mm | Pipe inside diameter | 1.35 mm |
| | Water flow rate | 4.0 gram per second | Water flow rate | 1.3 gram per second |
| | Water inlet temperature | 180 °C | Water inlet temperature | 180 °C |
| Outputs | Pressure drop along pipe | 2.2 Bar | Pressure drop along pipe | 0.27 Bar |
| | Water outlet temperature | 101.8 °C | Water outlet temperature | 100 °C |

CONDUIT B

| | High flow rate condition | | Nominal flow rate condition | |
|---|---|---|---|---|
| Inputs | Pipe length | 527 mm | Pipe length | 527 mm |
| | Pipe inside diameter | 1.2 mm | Pipe inside diameter | 1.2 mm |
| | Water flow rate | 4.0 gram per second | Water flow rate | 1.3 gram per second |
| | Water inlet temperature | 180 °C | Water inlet temperature | 180 °C |
| Outputs | Pressure drop along pipe | 2.6 Bar | Pressure drop along pipe | 0.31 Bar |
| | Water outlet temperature | 102.2 °C | Water outlet temperature | 113 °C |

CONDUIT C

| | High flow rate condition | | Nominal flow rate condition | |
|---|---|---|---|---|
| Inputs | Pipe length | 1000 mm | Pipe length | 1000 mm |
| | Pipe inside diameter | 1.6 mm | Pipe inside diameter | 1.6 mm |
| | Water flow rate | 4.0 gram per second | Water flow rate | 1.3 gram per second |
| | Water inlet temperature | 180 °C | Water inlet temperature | 180 |
| Outputs | Pressure drop along pipe | 2.3 Bar | Pressure drop along pipe | 0.28 Bar |
| | Water outlet temperature | 100 °C | Water outlet temperature | 100 °C |

FIGURE 5

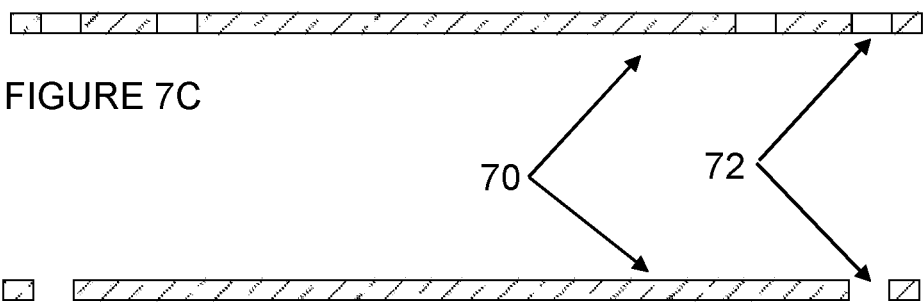
FIGURE 7C
FIGURE 7D
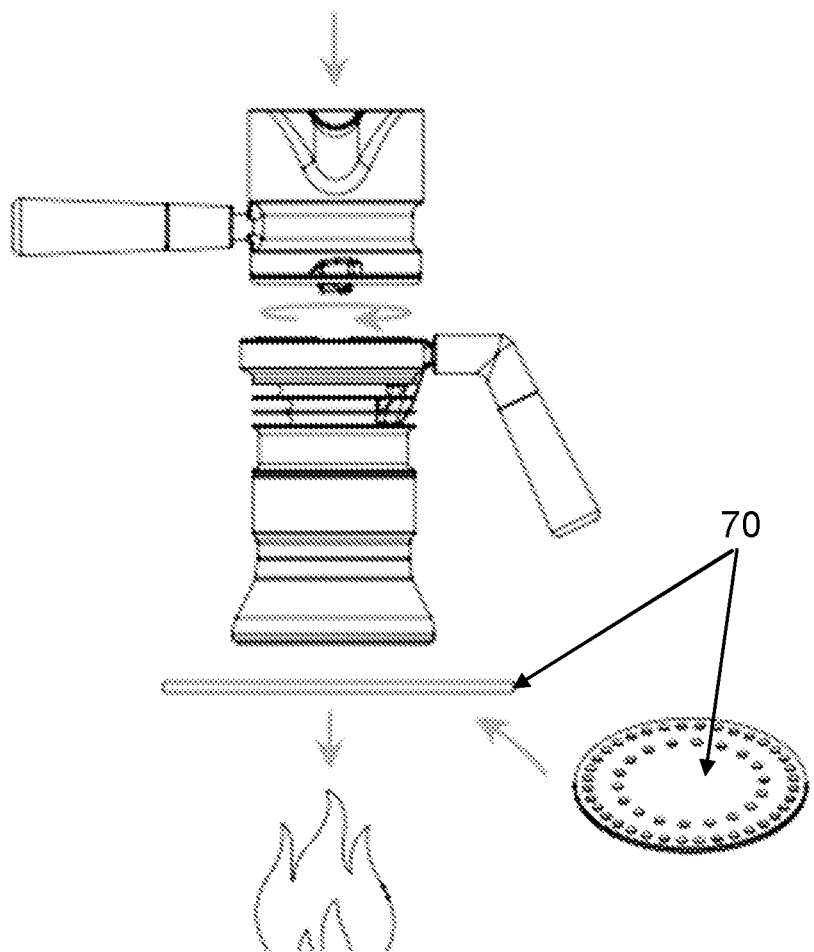
FIGURE 8

COFFEE-MAKING APPARATUS AND METHOD

The invention relates to a coffee-making apparatus and a method of making coffee, particularly espresso coffee. The invention further relates to a valve in a coffee-making apparatus, and an adapter plate for an induction hob.

BACKGROUND TO THE INVENTION

In order to produce espresso coffee, hot water is brought into contact with a source of coffee, typically ground coffee beans, such that a brewing process can occur. In order to extract the optimum aroma of the coffee into the resulting beverage, espresso brewing is carried out under certain conditions of temperature and pressure. It is widely accepted that for espresso coffee the ideal brew temperature range is between 90° C. and 96° C., while the ideal brew pressure range is between 7 bar and 11 bar gauge pressure (8 bar and 12 bar absolute pressure), and preferably about 9 bar gauge pressure. It is also important to arrange the source of coffee in such a way that brew water percolates evenly through the source of coffee, to ensure even extraction of flavour in the resulting beverage.

Gauge pressure is zero-referenced to atmospheric pressure, while absolute pressure is zero-referenced to a vacuum. Both are measured in units of bar, where 1 bar is equivalent to 100 kilopascals, or 100 kPa. A pressure of 0 bar gauge pressure is equivalent to ambient air pressure, which is roughly equivalent to 1 bar absolute pressure. All pressures referred to herein are gauge pressures unless specified otherwise.

Conventional espresso coffee machines are electrically operated and achieve the desired brew conditions by independently controlling the brew pressure and brew temperature through separate control systems. These machines typically achieve the desired brew temperature either by maintaining a constant supply of brew water at the desired temperature in a boiler, or by heating a small amount of brew water on demand within a heat block. Brew pressure is typically controlled by an electric fluid pump, which raises the pressure of the brew water up to the desired level and pumps the water through the ground coffee. Due to the complexity of these systems, espresso coffee machines tend to be large and expensive.

Other types of coffee-maker have achieved popularity by producing coffee using lower-complexity systems suitable for use with stove tops, or cooker hobs. A well-known example of these stove-top coffee-makers is the Bialetti Moka-Pot®. These machines typically use a saturated boiler to generate both brew temperature and brew pressure. This is done by heating brew water in the saturated boiler until the steam pressure in the boiler propels the brew water out of the boiler and through a chamber containing ground coffee beans. These machines are notable for their simplicity, often operating with a complete absence of electric power or control systems, and using only a single heat supply (the stove top) as the power source for the machine. However, due to the thermodynamic link between temperature and pressure, the saturated boiler in these machines is not capable of producing both the optimum brew temperature and brew pressure for espresso coffee.

In order to generate the ideal espresso brew pressure of 9 bar in a saturated boiler, the temperature of the brew water has to be raised to approximately 180° C. This is well above the optimum brew temperature. Conversely, if a saturated steam boiler is run at an operating temperature of 100° C., the brew pressure will be approximately 0 bar (gauge pressure). This is well below the optimum brew pressure. As a consequence, conventional stove-top coffee-makers are operated at sub-optimal brew conditions, with brew temperature exceeding 100° C. (typically 100-120° C.) and a low brew pressure of typically 0 bar to 1 bar gauge pressure.

A stove-top coffee-making apparatus that solves these problems is described in international patent application WO 2016/059426 A1 of Giocoguado Ltd.

In the apparatus of WO2016/059426A1 brew water is heated to approximately 180° C. in a saturated steam boiler to obtain the desired espresso brewing pressure of 9 bar. When this pressure is reached, a pressure valve opens to allow the brew water to flow from the brew water chamber upwards through a conduit towards a chamber containing ground coffee. In order to cool the brew water from 180° C. to the desired espresso brewing temperature of around 93° C., the conduit passes through a cooling chamber containing boiling water. As the cooling chamber is preferably open to the atmosphere, the boiling water in the cooling chamber always remains at a fixed temperature of its boiling point (100° C. at sea level). The 180° C. brew water in the conduit therefore loses heat by heat exchange with the 100° C. boiling water in the cooling chamber, so that the brew water cools to an equilibrium temperature of 100° C. inside the conduit. An air-cooling portion then cools the brew water a few more degrees, so that it reaches the ideal espresso brewing temperature of around 93° C. before it comes into contact with the ground coffee in the coffee chamber. The stove-top apparatus of WO2016/059426A1 therefore achieves desired brew water pressure and temperature using only a saturated steam boiler and a pressure valve.

Further modifications and improvements to coffee-making apparatuses, and in particular to the coffee-making apparatus of WO2016/059426A1, are the subject of this patent application.

SUMMARY OF THE INVENTION

The invention provides a coffee-making apparatus, a method of making coffee, a valve in a coffee-making apparatus, and an adapter plate for an induction hob as defined in the appended independent claims, to which reference should now be made. Preferred or advantageous features are set out in the dependent sub-claims.

The inventor has identified a shortcoming with the original design of the coffee-making apparatus of WO2016/059426A1, which is overcome by the present invention.

In a preferred embodiment of the coffee-making apparatus of WO2016/059426A1, a conduit leads from the brew-water chamber (the saturated steam boiler), upwards through the boiling-water cooling chamber, to a pressure valve upstream of a coffee chamber. The key features of this device are the combination of the pressure valve, which ensures that brew water reached a predetermined brewing pressure (preferably 9 bar, as this is desirable for espresso brewing), and the boiling water cooling chamber, in which boiling water acts as a cooling heat sink to cool the very hot (roughly 180° C.) brew water to around 100° C. before it passes through the valve and enters the coffee chamber.

During further development of this apparatus, the inventor has discovered that the design disclosed in WO2016/059426A1 does not perform as desired in the period between the pressure valve first opening, and the coffee chamber being completely full of brew water.

The flow rate behaviour of the prior art WO2016/059426A1 device is illustrated in FIG. 1 and described in detail below.

During operation of the device of WO2016/059426A1 on a stove top, when the pressure at the inlet of the pressure valve reached the valve opening pressure, the pressure valve opened fully, so that brew water could flow freely into the coffee chamber. The inventor has discovered that this resulted in an initial flow rate of brew water through the conduit and into the coffee chamber that was far higher than desired. As the brew water was flowing too fast through the conduit, it did not have time to cool sufficiently by heat loss to the boiling water in the cooling chamber. This resulted in the coffee chamber initially being filled up with brew water at far too high a temperature. This under-cooled brew water came into contact with the source of coffee in the coffee chamber, so that the initial phase of the coffee brewing was not performed at the intended brewing temperature. Another undesirable side-effect of this high initial flow rate was that heat was transferred into the boiling water in the cooling chamber too rapidly, leading to vigorous boiling of the cooling water, and in some embodiments boiling water being ejected from the vent in the cooling chamber along with the expected steam.

In a first aspect of the invention there is provided a coffee-making apparatus, comprising:
  a brew-water chamber for containing heated brew water;
  a coffee chamber;
  a water delivery system for delivering heated brew water from the brew-water chamber to the coffee chamber; and
  a cooling apparatus for cooling the heated brew water before it reaches the coffee chamber;
  in which the water delivery system comprises a conduit and a valve, openable when the pressure at a valve inlet reaches a valve opening pressure, for controlling a flow of brew water into the coffee chamber;
  in which the water delivery system is configured to control the flow rate of brew water while the coffee chamber is filling with brew water.

Optionally the water delivery system may be configured to control the flow rate of brew water to remain below a maximum flow rate while the coffee chamber is filling with brew water.

The apparatus operates as follows: in use, the brew-water chamber is filled with brew water, and a source of coffee is placed in the coffee chamber. The apparatus is then positioned so that a heat source, for example a stove-top or cooker hob, heats the brew-water chamber. As the brew water in the brew-water chamber heats, pressure builds up in the brew-water chamber. When the pressure at the valve inlet reaches the valve opening pressure, the valve opens and brew water starts to flow through the valve and fill up the coffee chamber. As brew water flows through the conduit to the valve, the brew water is cooled by heat exchange with the cooling apparatus. While the coffee chamber is filling with brew water, the water delivery system controls the flow rate of the brew water, for example to remain below a maximum flow rate. This may advantageously ensure that, while the coffee chamber is filling with brew water, the brew water flows slowly enough that it is cooled by the cooling apparatus and enters the coffee chamber at a desired temperature for brewing coffee. This controlled brew water flow also limits the rate at which heat is transferred into the cooling apparatus, so that if the cooling apparatus contains water, the cooling water is not boiled so vigorously that it is ejected from the cooling apparatus.

In addition to the source of coffee, the coffee chamber may comprise a volume for containing brew water, into which the brew water enters before it passes through the source of coffee. Before the valve opens, the coffee chamber contains no water, so that the coffee chamber begins to fill with brew water only once the valve has opened. The water delivery system of the present invention advantageously restricts the flow rate of the brew water during the period when the coffee chamber is first filling with brew water.

Once the coffee chamber is full of brew water, the compressed ground coffee presents a barrier restricting the onward flow of the brew water. When the ground coffee is correctly compressed for espresso coffee brewing, the flow resistance of the ground coffee preferably restricts the flow of brew water to a flow rate of around 1.3 ml/s, which is the desired flow rate for espresso brewing. Thus once the coffee chamber is full of water, the flow resistance of the coffee in the coffee chamber causes the apparatus to establish a "steady state" flow rate of brew water through the water delivery system, and through the source of coffee.

In the prior art device of WO2016/059426A1, the flow rate of brew water was uncontrolled while the coffee chamber was filling with brew water, as with the pressure valve fully open the brew water simply flowed as fast as the heat source heating the boiler would allow. The apparatus of the present invention, however, is configured to control, or regulate, or restrict, the flow rate of brew water while the coffee chamber is filling with brew water.

The effect of controlling the flow while the coffee chamber is filling up, is that the brew water is kept in the conduit for longer, so it cools down to the desired temperature. While in the prior art device, the very hot brew water flowed fast through the conduit and entered the coffee chamber at a very high temperature, in the present invention the valve opens and the water delivery system controls the flow rate while the coffee chamber fills up. This means the brew water has time to cool properly in the conduit before it enters the coffee chamber and contacts a source of coffee.

The brew water entering the coffee chamber is therefore at the desired espresso brewing temperature even during the period while the coffee chamber is initially filling with water.

The entire coffee brewing process may thus be carried out at the desired brewing temperature, to provide the desired coffee extraction characteristics.

Controlling the flow rate of the brew water while the coffee chamber is filling with brew water may also advantageously provide a period for pre-infusion of the coffee in the coffee chamber with brew water at the desired brewing temperature.

Preferably, the water delivery system is configured to control the flow rate of brew water to remain below a maximum flow rate while the coffee chamber is filling with brew water. The maximum flow rate may be chosen to be a flow rate above which brew water does not cool to a desired temperature before entering the coffee chamber. By maintaining the flow rate below this level, the water delivery system can therefore automatically ensure that the brew water is adequately cooled while the coffee chamber is filling up.

The cooling apparatus preferably comprises a cooling chamber for containing boiling water, in use, so that the brew water flowing through the water delivery system is cooled by heat flow to boiling water in the cooling chamber.

The coffee chamber is preferably configured to contain a source of coffee, in use, for example a quantity of ground coffee beans. The coffee chamber preferably comprises an outlet through which the brew water can flow after having passed through the source of coffee. The source of coffee is preferably provided as a compressed disc, or "puck", of ground coffee through which the brew water must flow in order to reach the outlet of the coffee chamber. As the brew water flows through the source of coffee, the coffee is brewed so that the liquid that flows through the outlet of the coffee chamber is brewed coffee.

The water delivery system may be configured to control the flow rate of brew water while the coffee chamber is filling with water so that brew water is cooled to a temperature of between 100° C. and 110° C. when it reaches the valve, preferably between 100° C. and 105° C., particularly preferably between 100° C. and 102° C.

In the present invention, the water delivery system may be configured to control the flow rate of brew water by generating a pressure drop between the brew-water chamber and the valve inlet. The magnitude of the pressure drop depends on the flow rate of brew water through the water delivery system. The valve may be configured to vary its position in response to the magnitude of the pressure drop, so that too high a flow rate generates a pressure drop that causes the valve to vary its position to reduce the flow rate of the brew water.

In the prior art device of WO2016/059426A1, the dimensions of the conduit were relatively short and wide, so that once the valve opened, the resistance to the flow of brew water presented by the conduit and valve was negligible. This lack of flow resistance allowed the flow rate of the brew water to increase to the maximum rate sustainable by the boiler, for example to a flow rate well in excess of 4 ml/s.

In WO2016/059426A1, the conduit and valve were designed with the steady state conditions of the brew water in mind, for example the temperature and pressure of the brew water once the system was full of water and the flow rate of brew water was constant. The sudden increase in flow rate on initial valve opening had not been appreciated. Parameters such as the material, diameter, wall thickness and surface area of the conduit were therefore chosen to provide advantageous heat exchange characteristics during normal brewing conditions. The conduit was also designed so that the pressure drop along the length of the conduit between the brew-water chamber and the coffee chamber was negligible. In the specific embodiment of WO2016/059426A1, brew water travelled through the conduit at a velocity of approximately 80 mm/s, and spent approximately 4 seconds in the conduit, indicating a conduit length of 320 mm.

The water delivery system may be configured to generate a predetermined threshold pressure drop between the brew-water chamber and the valve inlet when the flow rate of brew water reaches the maximum flow rate. At the maximum flow rate the threshold pressure drop may make the valve inlet pressure lower than the valve opening pressure. With the valve inlet pressure lower than the valve opening pressure, the valve will move towards a closed position, which will reduce the flow rate of the brew water.

By generating a threshold pressure drop that is sufficient to close the valve when the flow rate of brew water exceeds the threshold flow rate, the water delivery system may thus act as a flow rate limiter.

By configuring the water delivery system to generate a predetermined pressure drop at the selected maximum flow rate, the apparatus can automatically limit the flow rate of brew water to a desired flow rate lower than the maximum flow rate.

The idea of intentionally creating a pressure drop along the conduit is counterintuitive based on the disclosure of WO2016/059426A1, as WO2016/059426A1 teaches that a negligible pressure drop along the conduit is desirable, so that the brew water reaches the coffee chamber at the desired pressure.

The flow rate of brew water through the conduit and the pressure drop along the conduit are related to one another, so that as the flow rate of brew water through the conduit increases, the pressure drop between the brew-water chamber and the valve inlet also increases.

As there is a pressure drop between the brew-water chamber and the valve, the pressure experienced at the valve inlet is "[brew-water chamber pressure] minus [pressure drop]". Thus, although the pressure in the brew-water chamber may be, for example, 9 bar, the pressure drop along the conduit means that the pressure experienced at the valve is "9 bar minus the pressure drop".

The magnitude of the pressure drop at a given flow rate is determined by the characteristics of the water delivery system. For example, the length and the diameter of the conduit may determine the pressure drop along the conduit at a given flow rate. The water delivery system may therefore be configured to generate certain pressure drop characteristics by selecting a particular combination of conduit length and conduit diameter. The length and the internal diameter of the conduit may be selected to generate a predetermined pressure drop between the brew-water chamber and the pressure valve when the brew water flows at a predetermined flow rate, such as the predetermined maximum flow rate.

The water delivery system may be configured to generate a pressure drop by incorporating one or more flow resistance elements, or flow resistors, to the water delivery system. The water delivery system may comprise one or more flow resistance elements configured to generate a pressure drop upstream of the valve. Suitable flow resistance elements may comprise, for example, a narrowed portion of conduit, a plurality of baffles, or an orifice or flow constriction positioned in the water delivery system, through which the brew water must flow to reach the valve.

An exemplary flow resistance element may comprise a first portion of the conduit having a diameter smaller than the diameter of a second portion of the conduit.

A suitable flow resistance element may be an inertial flow resistance element configured to generate turbulence in the flow of brew water through the conduit. The flow resistance element may comprise a flow restrictor orifice positioned in the conduit, the flow restrictor orifice having a diameter smaller than the diameter of the rest of the water delivery system. Alternatively, the flow resistance element may comprise a plurality of baffles around which brew water must pass to flow along the conduit.

In order to generate a suitable flow resistance and pressure drop upstream of the valve, it is desirable to introduce one or more constrictions to flow in the water delivery system. However, such constrictions may be vulnerable to blockage with limescale, for example, following sustained use of the apparatus. It may therefore be advantageous to generate the desired pressure drop while keeping the internal diameter of the water delivery system large enough to prevent limescale blocking the flow path.

The present inventor has found that by selecting particular length and internal diameter dimensions for the conduit, both of these aims can be achieved without the use of an additional flow restrictor.

In preferred embodiments, the conduit may have a length of between 500 mm and 2500 mm, preferably between 700 mm and 2000 mm, particularly preferably between 800 mm and 1200 mm.

In preferred embodiments, the conduit may have a uniform internal diameter of between 1.1 mm and 2 mm, preferably between 1.2 mm and 1.6 mm, particularly preferably between 1.3 mm and 1.4 mm.

Particularly preferably, the conduit may have a length of between 800 mm and 1200 mm, and a uniform internal diameter of between 1.3 mm and 1.4 mm.

Such long conduits are more difficult and costly to manufacture for a compact stove-top apparatus than the 320 mm-long example conduit in WO2016/059426A1, but the present inventor has found that they may advantageously provide desirable pressure drop characteristics in addition to excellent heat exchange characteristics.

When the water delivery apparatus is configured to restrict the flow of brew water to remain below a maximum flow rate, the maximum flow rate may be selected as the maximum acceptable flow rate of brew water into the coffee chamber. The water delivery system may be configured so that, when the flow rate exceeds this maximum value, the pressure drop along the conduit between the brew-water chamber and the valve increases to a "threshold pressure drop". The threshold pressure drop may be selected as a pressure drop large enough for the valve to close.

In a preferred embodiment, for example, the maximum flow rate may be 4 millilitres per second (ml/s), which for an example apparatus may be the maximum acceptable flow rate of brew water into the coffee chamber.

The water delivery system may be configured to control the flow rate of brew water to remain below a predetermined maximum flow rate of 4 ml/s, or 3.5 ml/s, or 3 ml/s, while the coffee chamber is filling with brew water. At or below such a maximum flow rate, the brew water may advantageously lose enough heat to the cooling apparatus so that the brew water enters the coffee chamber at a desired temperature, preferably at a temperature of less than 110° C., or less than 105° C., or particularly preferably less than 102° C. Particularly preferably flow rates below these maximum flow rates may result in the temperature of the brew water equilibrating with the temperature of the boiling water in the cooling chamber, so that it enters the coffee chamber at 100° C., or slightly cooler than 100° C. if the apparatus comprises a further cooling portion between the valve and the coffee chamber.

The water delivery system may be configured to generate a pressure drop of at least 0.5 bar, preferably a pressure drop of at least 1 bar, or 1.25 bar, or 1.5 bar, or 2 bar, between the brew-water chamber and the valve when the flow rate of brew water through the water delivery system is equal to the maximum flow rate. Such a pressure drop may be sufficient so that at the maximum flow rate, the position of the valve moves to reduce the flow rate of brew water.

The water delivery system may be configured to generate a pressure drop of at least 0.5 bar, preferably a pressure drop of at least 1 bar, or 1.25 bar, or 1.5 bar, or 2 bar, between the brew-water chamber and the valve when the flow rate of brew water through the water delivery system is 4 ml/s.

The water delivery system may be configured to generate a pressure drop of less than 0.5 bar, preferably less than 0.4 bar, particularly preferably less than 0.3 bar between the brew-water chamber and the pressure valve when brew water flows through the water delivery system at a flow rate of 1.3 ml/s. Thus, once the coffee chamber is filled with water and the apparatus establishes its steady state flow rate of brew water, the pressure drop between the brew water chamber and the valve is advantageously small relative to the pressure of the brew water chamber.

The coffee chamber is preferably configured to contain a source of coffee, a perforated plate upstream of the source of coffee, and an upstream portion of the coffee chamber upstream of the perforated plate for receiving brew water from the valve. The water delivery system advantageously restricts the flow rate of the brew water while the upstream portion of the coffee chamber is filling with brew water.

The coffee chamber is preferably configured to receive a volume of brew water of between 10 ml and 15 ml. In addition to this, the coffee chamber is preferably configured to receive a coffee puck of the dimensions standard for a double shot of espresso coffee.

The water delivery system may be configured to control the flow rate of brew water so that it takes between 2.5 seconds and 10 seconds for the coffee chamber to be filled with water, or between 3 seconds and 7 seconds, preferably between 4 seconds and 6 seconds. By controlling the flow rate so that the coffee chamber takes this amount of time to fill with brew water, the brew water may advantageously have time to cool to the desired temperature before it reaches the brew water chamber.

The valve is preferably configured to open fully when the coffee chamber is filled with brew water, in response to back pressure acting on the valve. Thus, when the coffee chamber is filled with brew water and the compressed coffee is providing a resistance to the onward flow of brew water, the back pressure in the coffee chamber increases so that the back pressure acts on the valve. In response to this back pressure, in combination with the upstream pressure of the brew water, the valve may open fully, so that the flow of brew water is regulated only by the flow resistance of the source of coffee. This allows the apparatus to establish a steady state of brew water flow, so that brew water flows through the source of a coffee at a consistent flow rate (preferably about 1.3 ml/s when the coffee is correctly ground and compressed), and at a consistent temperature.

The valve may be termed a pressure valve.

The valve may be configured so that the position of the valve is continuously variable between a closed state, in which no brew water flows through the conduit, a partially open state in which the valve partially obstructs the conduit and restricts the flow of brew water through the valve, and a fully open state, in which the valve does not obstruct the flow of brew water. In the partially-open state, the openness of the valve may vary continuously depending on the pressure of brew water at the valve.

The valve may be configured so that, when the valve opens, the valve controls the flow rate of brew water by varying the position of the valve to maintain the valve inlet pressure at a pressure equal to the valve opening pressure.

The desired brewing pressure is typically between 8 bar and 10 bar, particularly preferably 9 bar gauge pressure.

The inventor has appreciated that, as the apparatus is configured for operation on an external heat source such as a hob or a gas stove, heat will be continuously input into the brew-water chamber during the brewing process. A typical domestic heat source will input heat at a sufficient rate to cause the temperature of the brew water chamber to rise during brewing, resulting in an increase in the pressure while the coffee is brewing, even after the valve has opened.

As the water delivery system in the present invention initially restricts the flow rate of the brew water, the period between the initial valve opening and the coffee chamber being completely full of water will be increased compared to the device of WO2016/059426A1. Continued heat input into the brew-water chamber during this period will cause the pressure in the brew-water chamber to increase above the valve opening pressure. Depending on the rate of heat input, the pressure in the brew-water chamber may increase further during the steady state brewing of the coffee.

In order to mitigate the effect of this pressure increase, the valve opening pressure may preferably be set at a pressure lower than the pressure desired for brewing the coffee. By opening the valve at a pressure below the desired brewing pressure, under normal operating conditions the continued input of heat to the brew-water chamber may advantageously raise the brew-water chamber pressure to approximately 9 bar at the time that the coffee chamber is full of brew water, and the steady state brewing conditions are established. While continued heat input may cause a slight further increase in brew-water chamber pressure after this time, under normal operating conditions the coffee will be brewed within the desired brew pressure range of 8 to 10 bar, preferably 9 to 10 bar.

In preferred embodiments, the valve opening pressure may be a pressure below 9 bar, or below 8 bar, for example a pressure between 6 bar and 8 bar, or between 7 bar and 8 bar.

In a particularly preferred embodiment, the valve opening pressure may be a pressure of around 7.5 bar.

The coffee-making apparatus may be a stove-top coffee-making apparatus. The apparatus is preferably configured for use with a stove-top or cooker hob as the heat source for heating brew water in the brew-water chamber.

The apparatus may advantageously comprise a chimney configured to vent steam from the cooling chamber. Preferably the chimney is configured to direct steam away from handles of the apparatus. Following further development of the device of WO2016/059426A1 the inventor has realised that following initial opening of the valve, the commencement of brew water flow through the water delivery system delivers a large amount of heat to the water in the cooling chamber. This creates a large initial release of steam from the boiling water in the cooling chamber, which is safely channelled away from the handles by the chimney.

Operation of the Apparatus

When the coffee-making apparatus is heated and the steam pressure in the brew-water chamber reaches the valve opening pressure, the valve opens.

As there is initially a large pressure difference across the valve, the brew water initially tries to flow rapidly through the conduit, through the open valve, and into the coffee chamber, as occurs in the prior art design. In the water delivery system of the present invention, however, should the initial flow rate immediately become too large, for example by exceeding the maximum flow rate, the pressure drop along the water delivery system will increase to a threshold pressure drop. This pressure drop means that the pressure experienced at the valve inlet drops to a pressure below the valve opening pressure, and the position of the valve moves towards its closed position.

The relative closing of the valve immediately reduces the flow rate of the brew water through the conduit, and causes the pressure at the valve to rapidly rise again to the valve opening pressure.

The valve thus establishes an equilibrium state while the coffee chamber fills with water, in which the valve is partially open and allows a controlled flow of brew water to pass through the valve and into the coffee chamber. If the flow rate increases, the pressure drop increases and so the valve moves towards its closed position, so that the flow rate decreases. If the flow rate decreases, the pressure drop decreases so the valve opens further, so that the flow rate increases. An equilibrium state is therefore maintained at which the valve inlet pressure is maintained at the valve opening pressure.

By configuring the water delivery system to generate a controlled pressure drop, this arrangement advantageously allows the apparatus to maintain the flow rate of brew water below the threshold flow rate. The flow rate may therefore be maintained at a flow rate low enough that the heated brew water cools down to a temperature suitable for espresso brewing, preferably to a temperature below about 102° C. when it enters the coffee chamber.

Method of Making Coffee

According to a second aspect of the invention, there is provided a method of making coffee, comprising the steps of:

heating brew water contained in a brew-water chamber until it reaches a valve opening pressure, at which a valve opens and brew water flows through a water delivery system to a coffee chamber;

cooling the brew water by heat flow to a cooling apparatus as it flows through the water delivery system; and controlling the flow rate of the brew water while the coffee chamber is filling with water.

The method may comprise the step of controlling the flow rate of brew water to remain below a maximum flow rate while the coffee chamber is filling with water.

The method may comprise the step of controlling the flow rate of brew water while the coffee chamber is filling with water so that the brew water cools to a temperature of between 100° C. and 110° C. before it enters the coffee chamber, preferably between 100 C and 105 C, particularly preferably between 100 C and 102 C.

The method may comprise the initial steps of placing a source of coffee in the coffee chamber, and filling the brew-water chamber with brew water.

The brew water is preferably cooled by heat flow to boiling water.

The flow rate of the brew water may be controlled by varying the position of the valve in response to a pressure drop between the brew-water chamber and the valve.

The method of making coffee may be a method of use of the apparatus according to the first aspect of the invention.

Other features and advantages of the method may be as described above in relation to the first aspect of the invention.

Valve

According to a third aspect of the invention there is provided a valve in a coffee-making apparatus, the valve comprising:

an inlet;

an outlet; and a valve head, which is movable between a closed position, in which the valve head prevents liquid flow from the inlet to the outlet, a partially open position, in which the position of the valve head partially obstructs the flow of liquid from the inlet to the outlet, and a fully open position, in which the valve head is biased towards its closed position;

and in which the valve is configured so that the valve head is openable in response to an upstream pressure acting on a first hydraulic area of the valve head, and in response to a downstream pressure acting on a second hydraulic area of the valve head.

The valve is preferably configured to sense pressure downstream of the valve, and to open fully in response to the downstream pressure exceeding a threshold downstream pressure.

The valve is preferably configured so that when the upstream pressure reaches a valve opening pressure and the downstream pressure is zero bar gauge pressure, the valve adopts its partially open position, and controls, regulates, or restricts the flow rate of fluid from the inlet to the outlet.

The valve is preferably usable in the coffee-making apparatus according to the first aspect of the invention, but is advantageously also usable in alternative coffee-making apparatuses.

The valve is preferably configured to control a flow of brew water in a coffee-making apparatus. Particularly preferably the valve is configured to control a flow of brew water in a coffee-making apparatus while a downstream coffee chamber is filling with brew water.

The valve is preferably configured in the coffee-making apparatus so that the inlet is in fluid communication with a conduit for supplying brew water from the brew-water chamber, and with the outlet in fluid communication with the coffee chamber.

When the coffee-making apparatus is operated as described above, pressure in the brew-water chamber rises and forces brew water up into the water delivery system, causing the upstream pressure experienced at the inlet of the valve to rise. Early in operation, the coffee chamber is empty of water, so the downstream pressure at the outlet of the valve is atmospheric pressure. In the present invention, the valve head is configured so that upstream pressure acts on the first hydraulic area of the valve head. Therefore, when the upstream pressure caused by the brew-water chamber reaches the valve opening pressure, the upstream pressure forces the valve head open and water begins to flow through the valve from the inlet to the outlet. While the coffee chamber is filling up with brew water, the downstream pressure acting on the second hydraulic area of the valve head is very low compared to the upstream pressure, and the valve head establishes an equilibrium in its partially open state. When the coffee chamber is full of brew water, however, back pressure begins to build as more water flows into the coffee chamber (due to the increased flow resistance as the water passes though the ground coffee), so downstream pressure acts on the second hydraulic area of the valve head. This means that the valve head experiences the combination of upstream and downstream pressures acting against it, forcing it away from its closed position. These pressures combine to overcome the biasing of the valve head towards its closed position, so that the valve head opens completely into its open position. The valve will then remain in its fully open position throughout the coffee brewing process, allowing the establishment of a consistent brew water flow rate determined by the flow resistance of the coffee.

This valve design therefore allows the flow of water to be regulated based initially on the upstream pressure alone, until the downstream pressure rises enough for the valve to open completely.

In a preferred embodiment, the second hydraulic area sensitive to the downstream pressure is ~30% of the first hydraulic area sensitive to the upstream pressure. So, once there is a back pressure build up downstream of the valve, the force on the spring suddenly increases by 30%, which promptly fully opens the valve.

The position of the valve head is preferably continuously movable in its partially-open state, so that the valve head may vary its position continuously between open and closed states in response to the flow rate of brew water through the valve and the upstream and downstream pressures acting on the valve head.

The valve preferably comprises a valve seat comprising an aperture which is in fluid communication with either the inlet or the outlet. The valve head is preferably configured to protrude into the aperture and seal against the valve seat when the valve is closed.

The valve head is preferably movable along an axis and biased towards the valve seat by a biasing means.

Either the first or the second hydraulic area preferably comprises a surface, or a sidewall, of the valve head that is angled relative to the axis of the valve head, so that pressure acting orthogonally to the axis of the valve head produces a component of force that acts on the angled surface to force the valve head away from the valve seat.

The other of the first or the second hydraulic area preferably comprises a tip of the valve head, so that pressure on the tip of the valve head acts directly against the biasing force to force the valve head away from the valve seat along its axis.

The valve may be configured so that the valve seat is provided around the outlet, and the valve head is biased to protrude into and seal against the outlet. In this arrangement, the first hydraulic area which is exposed to upstream pressure is an angled sidewall of the valve head, while the second hydraulic area of the valve head which is exposed to downstream pressure is the valve head tip protruding into the aperture in the valve seat.

Alternatively, the valve may be configured so that the valve seat is provided around the inlet, and the valve head is biased to protrude into and seal against the inlet. In this arrangement, the first hydraulic area which is exposed to upstream pressure is the valve head tip protruding into the aperture in the valve seat, while the second hydraulic area of the valve head which is exposed to downstream pressure is an angled sidewall of the valve head The valve head preferably comprises a tip configured to protrude into the aperture, and a bevelled portion, or bevelled surface, surrounding the tip, to seal against the valve seat. The bevelled surface is preferably angled with respect to the axis of the valve head. In this embodiment, the tip of the valve head provides one of the first and second hydraulic areas, and the bevelled portion provides the other of the first and second hydraulic areas. The valve head may comprise a conical portion, the tip of which is configured to protrude into the aperture.

The valve seat and/or the valve head are preferably formed from PTFE. The inventor has found PTFE to advantageously be soft enough to create an effective seal between the valve head and the valve seal, but hard enough to give a precise and repeatable flow rate regulating behaviour when the valve is in its partially open position.

The angled, or bevelled, or tapered, surface of the valve head may have an angle of between 10 and 30 degrees from the normal axis of the valve head, preferably between 15 and 20 degrees from the normal axis, particularly preferably between 16 and 18 degrees from the normal axis. As the taper angle is reduced, the contact surface pressure between the valve head and the aperture in the valve seat increases, for a given biasing force. This advantageously results in a better seal. With too shallow a taper angle, however, frictional forces begin to dominate the opening force on the valve, and the valve head may become stuck in the aperture.

The position of the valve head may advantageously be continuously variable between the closed state and the fully open state in response to the flow rate of the water flowing through the inlet.

The valve is configured to open to its partially open state at an upstream pressure below 9 bar, or below 8 bar, for example a pressure between 6 bar and 8 bar, or between 7 bar and 8 bar, when the downstream pressure is zero bar gauge pressure.

A rear portion of the valve head is preferably open to atmospheric pressure. For example, the valve may comprise a recess configured to receive the valve head in its open state, and the recess may be open to atmospheric pressure.

The biasing member may be a spring housed in the recess, and configured to bias the valve head towards the valve seat.

Features described in relation to the third aspect of the invention may apply equally to the valve of the first and second aspects of the invention, and vice versa.

In a preferred aspect, a coffee-making apparatus may comprise the valve of the third aspect of the invention, and a flow resistance element upstream of the valve.

Hob Adapter Plate

According to a fourth aspect of the invention there is provided an adapter plate for an induction hob. The adapter plate comprises: an upper surface; a lower surface; at least one layer of ferrous metal; and a plurality of holes extending through the plate between the upper surface and the lower surface.

An induction hob may alternatively be termed an induction cooker or an induction stove-top.

Ferrous metal is used so that it interacts with induction cookers. The layer of ferrous metal may be iron, or cast iron, or preferably steel, ferritic steel, stainless steel, or carbon steel.

The layer of ferrous metal in the adapter plate advantageously means that when the adapter plate is placed on an induction hob, the induction hob induces an electrical current in the adapter plate which heats the adapter plate. An item or vessel, for example a cooking vessel or coffee-making apparatus which is not suitable for use directly with an induction hob, may then be heated by conduction from the adapter plate, preferably by placing the item on top of the adapter plate.

The adapter plate may therefore advantageously allow items to be heated on an induction hob even if they are not compatible with induction cookers.

The adapter plate according to the third aspect comprises a plurality of holes extending through the plate between the upper surface and the lower surface. While induction hob adapter plates are known in the prior art, such known adapter plates do not comprise holes. The reason for this is that holes through the adapter plate reduce the amount of material available to generate and conduct heat in the adapter plate, and may therefore reduce the efficiency of the adapter plate when used on an induction hob, comparative to a plate of the same dimensions without holes. Drilling holes through one of the induction hob adapter plates of the prior art would therefore be counterintuitive, as it would reduce the effectiveness of the adapter for its intended use.

In the present invention, however, the holes may advantageously make the adapter plate particularly suitable for use as an adapter plate for gas hobs as well as induction hobs.

The dimensions of the plate are preferably large enough that the plate may be mounted on a pan support of a gas hob. Items with a relatively small base dimension are frequently not usable on the pan supports of gas hobs, as the opposing fingers of the pan supports may be too far apart for a small-diameter vessel to balance reliably and safely above the flame. The present adapter plate may thus advantageously allow a vessel to be positioned on top of the adapter plate and heated by conduction from the gas flame, through the adapter plate, to the item positioned on the adapter plate.

The holes through the adapter plate may advantageously significantly increase the efficiency of heat transfer from a gas hob below the adapter plate to an item positioned on top of the adapter plate.

The inventor of the adapter plate have found that, surprisingly, providing two rings of holes arranged concentrically around a circular adapter plate can as much as double the heat transfer to an item positioned on top of the adapter plate. That is, providing holes in the adapter plate can double the speed at which a pan of water on the adapter plate boils compared to the same adapter plate without holes. This is particularly the case when the holes are provided at a radius on the plate that is greater than the radius of the item being heated on the plate.

The reason for this increased efficiency is thought to be that, rather than trapping a relatively cold laminar boundary layer of air between the bottom of the adapter plate and the gas flame, the holes in the adapter plate may allow the cold air to escape upwards through the holes, reducing the insulating effect of this boundary layer. This may allow the heated gases from the flame to conduct heat to the bottom surface of the adapter plate more efficiently than would be possible for a plate of the same dimensions without holes.

Prior art devices known as "heat diffusers" are known for use with a gas hob, and these devices may comprise holes. However, these devices are specifically intended to reduce the amount of heat transferred from the gas flame to a cooking vessel, for example so that liquids can be kept at a low simmer. As the use of holes in these heat diffusers is intended to reduce heat transfer, it is again counterintuitive that the provision of holes in the present adapter plate increases the heat transfer efficiency of the plate. Heat diffusers are not compatible with induction hobs.

The adapter plate of the third aspect may therefore provide an advantageous solution to both make non-ferritic vessels usable with induction hobs, and to make small-diameter vessels usable with gas hobs.

The adapter plate of the present invention may thus be particularly useful for use with a small-diameter vessel which is not compatible with induction hobs. One such vessel may be a coffee-making apparatus as described in relation to the other aspects of the present application.

The adapter plate may preferably comprise a layer of non-ferrous metal, particularly preferably a layer of aluminium. This may advantageously help to conduct heat generated in the layer of ferrous metal around the adapter plate.

The layer of aluminium may preferably be positioned between two layers of ferrous metal. In this arrangement, heat may be generated by induction in the layers of ferritic steel, while the layer of aluminium conducts heat effectively throughout the plate, to ensure even heating of an item on the plate.

The layer of aluminium preferably has a thickness of at least 2 mm, or at least 2.5 mm, or at least 3 mm, and/or less than 3.5 mm, or 4 mm, or 5 mm.

Preferably the or each layer of ferrous metal has a thickness of at least 0.05 mm. In preferred embodiments, the or each layer of ferritic steel has a thickness of at least 0.25 mm, or 0.4 mm, or 0.5 mm, or 0.6 mm.

Preferably the adapter plate is circular.

The plate preferably comprises a plurality of holes arranged in a ring around the plate at a constant radius from its centre. The inventor has found that a ring of holes around the plate produces the unexpected effect of increasing heat transfer from a gas hob to an item on the adapter plate.

In a preferred embodiment, a circular adapter plate comprises a plurality of holes arranged in a first ring at a first radius around the centre, and a plurality of holes arranged in a second ring at a second radius around the centre, in which the second radius is greater than the first radius. This may further improve the heat transfer characteristics of the plate when used above a gas flame.

The second ring may comprise a greater number of holes than the first ring.

In preferred embodiments, the first ring comprises at least 14 holes, preferably at least 18 holes, particularly preferably 20 holes. Preferably the first radius is between 40 mm and 50 mm, particularly preferably about 45 mm.

In preferred embodiments, the second ring may comprise at least 20 holes, preferably at least 30 holes, particularly preferably 36 holes. Preferably the second radius is between 60 mm and 70 mm, particularly preferably about 65 mm.

The holes may have a diameter of between 4 mm and 8 mm, preferably between 5 mm and 7 mm, particularly preferably between 6 mm and 6.5 mm. Holes of these diameters may advantageously lead to improved efficiency when the plate is used on a non-induction heat source, while leaving enough surrounding material to generate and conduct heat when the adapter plate is used on an induction hob.

The plate may comprise a continuous ring of ferritic steel extending around the plate between a radius of 50 mm and 60 mm from the centre of the plate. This continuous ring of ferritic steel may therefore have a width of at least 10 mm. Providing a continuous ring of ferritic steel at this position may advantageously ensure that the adapter plate is sensed by induction hob "burners", so that the induction hob is activated to heat the adapter plate.

In preferred embodiments, the adapter plate is circular and has a diameter of between 130 mm and 160 mm, preferably between 140 mm and 150 mm. In a particularly preferred embodiment the diameter of the adapter plate may be 145 mm.

The plate preferably consists of a solid sheet of metal, with the plurality of holes extending through the whole thickness of the plate. This may advantageously provide good heat conduction characteristics.

The plate is preferably circular and comprises no holes at a radius of less than 40 mm from the centre of the plate. This may advantageously provide a solid central region of the adapter plate with good heat transfer characteristics, on which a vessel may be positioned.

The upper and lower surfaces of the adapter plate are preferably flat for sitting flat against the glass or ceramic surface of an induction hob.

In a further aspect of the invention, a kit may be provided, comprising: a coffee-making apparatus and the adapter plate of the third aspect.

The coffee-making apparatus may be a coffee-making apparatus according to an aspect of the present invention. The coffee-making apparatus may be unsuitable for use directly with induction hobs. The coffee-making apparatus may be a stove-top coffee-making apparatus with a base having a diameter of less than 100 mm, or less than 90 mm, or less than 80 mm. A base of such relatively small dimensions may be unsuitable for use with most gas hob pan supports. The adapter plate may therefore allow the coffee-making apparatus to be heated using a conventional gas or induction hob where that would not otherwise be possible.

SPECIFIC EMBODIMENTS AND BEST MODE OF THE INVENTION

Specific embodiments of the invention will now be described by way of example, with reference to the accompanying drawings, in which;

FIG. 2A is a schematic illustration of a first embodiment of the coffee-making apparatus according to the first aspect of the invention;

FIG. 2B is a schematic illustration of a second embodiment of the coffee-making apparatus according to the first aspect of the invention;

FIG. 2C is a schematic illustration of a third embodiment of the coffee-making apparatus according to the first aspect of the invention;

FIG. 3 is a schematic diagram of brew water flow in the coffee-making apparatus according to the first aspect of the invention;

FIG. 5 is a table showing experimental results for exemplary conduits;

FIGS. 7C and 7D are cross sections of the adapter plate of FIG. 7A, taken across the diameter of the plate at different angular positions;

FIG. 8 illustrates the use of the adapter plate of FIGS. 7A-7D with the coffee-making apparatus of FIG. 4B, on a heat source.

Figure 1:
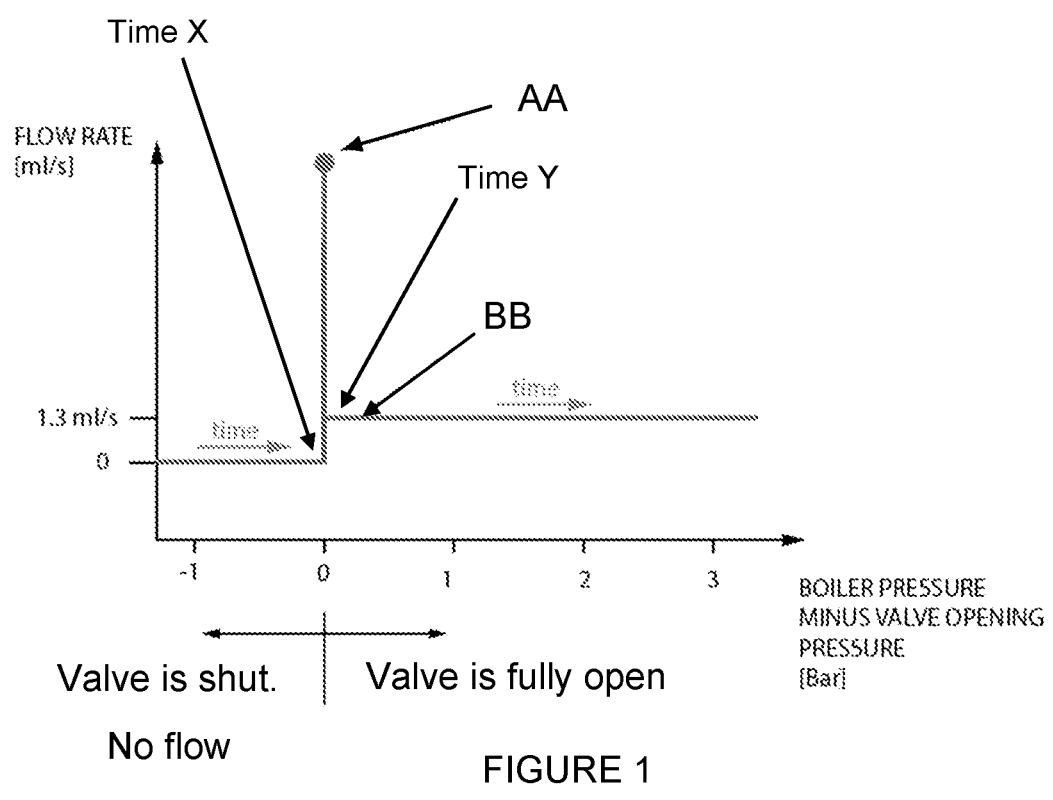
FIG. 1 is a schematic diagram of brew water flow in the prior art device of WO2016/059426A1.

The flow rate behaviour of the prior art device of WO2016/059426A1 is illustrated in FIG. 1.

During operation of the device of WO2016/059426A1 on a stove top, the brew water in the brew water chamber (boiler) was heated, and the steam pressure in the brew water chamber built up as expected. As the boiler pressure increased, brew water was gradually forced up the conduit to compress the air originally contained in the conduit upstream of the pressure valve. When the pressure at the inlet of the pressure valve reached the valve opening pressure at Time X, the pressure valve opened fully, so that brew water could flow freely into the coffee chamber.

With the valve open, the inventor discovered that the flow rate of brew water through the conduit and into the coffee chamber was far higher than desired. With the pressure valve fully open, the flow rate of the brew water was being determined solely by the fluid pumping capacity of the boiler, which in turn was a function of the rate of heat input into the boiler.

As the brew water chamber was being continuously heated on the stove top, brew water continued to flow through the conduit and into the coffee chamber at too high a flow rate, until Time Y when the coffee chamber was full of brew water. From Time Y onwards, the coffee chamber is full of water, and the puck of compressed coffee grounds in the coffee chamber provides a resistance to the flow of brew water out of the coffee chamber. With the coffee chamber full of water the flow resistance of the coffee therefore caused the flow rate of water through the apparatus to drop, ideally to a flow rate of around 1.3 ml/s, which is desired for espresso brewing.

At point AA, Flow rate is governed by the fluid pumping capacity of the boiler which is a function of the rate of heat input—which is a constant when the apparatus is heating on a conventional heat source.

Between Time X until Time Y, the coffee chamber was filling with brew water at too high a flow rate, for example a flow rate of greater than 4 ml/s. The effect of this high flow rate from the brew water chamber, through the conduit, and into the coffee chamber, is that brew water leaving the brew water chamber at 180° C. does not cool down to the desired temperature of 100° C. before entering the coffee chamber. The high flow rate meant that the very hot brew water spent too little time in the conduit, and therefore did not have time to lose 80° C. of heat by heat exchange with the boiling water in the cooling chamber. The result of this was that the coffee chamber was initially filled with overheated brew water, the temperature of which was significantly higher than the desired brewing temperature. This under-cooled brew water came into contact with the source of coffee in the coffee chamber at a higher temperature than desired, so that the initial brewing of the coffee was not performed at the intended brewing temperature.

At point BB, once the water rises to meet the coffee, the flow resistance increases, and the flow rate drops.

From Time Y onwards, the design of WO2016/059426A1 performs well, as brew water at the desired flow rate of 1.3 ml/s, as well as the desired temperature and pressure, displaces the under-cooled brew water that initially fills the coffee chamber, and the rest of the brewing takes place under the desired conditions.

FIGS. 2A, 2B and 2C are schematic diagrams illustrating the principles of operation of different embodiments of coffee-making apparatuses for espresso coffee according to the first aspect of the invention.

In use, a brew-water chamber 2 contains brew water 4, a cooling chamber 8 contains boiling water 10, and a coffee chamber 18 contains a source of coffee 22.

As shown schematically in FIGS. 2A, 2B and 2C, the brew-water chamber 2 is heatable by a first heat source 6, and a cooling chamber 8 is heatable by a second heat source 12.

The cooling chamber comprises a cooling-chamber pressure valve 14 openable at a predetermined pressure (though in other embodiments the cooling chamber is open to the atmosphere). A conduit 16 leads from the brew-water chamber, through a heat-exchange portion 17 of the conduit in thermal contact with water in the cooling chamber, to a coffee chamber 18. The conduit is closed by a pressure valve 20, openable in response to the pressure at the valve inlet reaching a valve opening pressure. The pressure valve 20 has a closed state, in which the valve blocks the conduit 16, a continuously variable partially-open state, in which the valve partially blocks the conduit and restricts the flow of fluid, and an open state, in which fluid may pass through the conduit.

The first heat source 6 heats brew water 4 contained in the brew-water chamber 2. The conduit protrudes, in use, below the surface of the brew water 4 in the brew-water chamber 2. The brew-water chamber is closed, other than at an entrance to the conduit. When the brew water reaches a temperature equal to or greater than its boiling point steam 5 is generated in the brew-water chamber, and the brew-water chamber functions as a saturated steam boiler. At temperatures greater than 100° C., the brew-water chamber thus contains saturated steam and water. As the brew water boils, the steam pressure in the brew-water chamber increases. As the boiling point of the brew water depends on the vapour pressure of the saturated steam in the brew-water chamber, the brew water is heated to a temperature greater than 100° C. as the vapour pressure increases above atmospheric pressure. When the steam pressure in the brew-water chamber is equal to the valve opening pressure of the pressure valve 20, the brew water is at a first temperature greater than 100° C. and a first pressure greater than 0 bar. For example the first temperature may be about 180° C. and the first pressure about 9 bar.

A second heat source 12 heats boiling water 10 contained in the cooling chamber 8. When the boiling water is at a temperature greater than or equal to its boiling point, the boiling-water cooling chamber acts as a saturated steam boiler. The steam pressure in the boiling-water cooling chamber is regulated by the cooling-chamber pressure valve 14. When the steam pressure rises above the predetermined pressure of the cooling-chamber pressure valve, the valve opens and excess steam is vented to the atmosphere. By regulating the steam pressure in the boiling-water cooling chamber in this way, the boiling water 10 is maintained at a second pressure and a second temperature. The second temperature and pressure are lower than the first temperature and pressure, and the second temperature may be greater than or equal to the boiling point of water at ambient pressure. For example, if the cooling-chamber pressure valve is openable at 0.03 bar, the boiling water is maintained at a temperature of approximately 101° C. If the cooling-chamber pressure valve is openable at 0.20 bar, the boiling water is maintained at a temperature of approximately 105° C. The cooling-chamber pressure valve may optionally be adjustable to open at different predetermined pressures, so as to regulate the steam pressure in the boiling-water cooling chamber, and thus the temperature of the boiling water 10.

In alternative embodiments, the cooling-chamber pressure valve 14 is not used, and the cooling chamber is open to the atmosphere, so that the boiling water 10 is maintained at 100° C.

When the pressure in the brew-water chamber reaches the threshold pressure, the pressure valve 20 opens, and the brew water 4 begins to flow through the conduit 16 and fill the coffee chamber.

As brew water 4, which is preferably at a temperature of around 180° C., flows through the conduit, it loses heat to the boiling water 10 in the cooling chamber. This cooling step brings the temperature of the brew water towards the desired temperature for brewing espresso coffee.

As the inventor has appreciated that the initial flow rate of brew water is too high in the prior art device of WO2016/059426A1, the apparatuses of FIGS. 2A, 2B and 2C are configured to control the flow rate of brew water 4 to remain below a maximum flow rate while the coffee chamber 18 is initially filling with water.

FIG. 3 illustrates how this affects the flow rate of brew water into the coffee chamber compared with the behaviour of the prior art device shown in FIG. 1.

The apparatuses shown in FIGS. 2A and 2B comprise a flow resistance element 24 upstream of the valve, in the form of a narrowed section of the conduit 16. This narrowed section of conduit has an internal diameter lower than that of the rest of the conduit 16, so that it behaves as a viscous flow resistor, where pressure is dissipated through viscous loss in the boundary layer flow along the length of the conduit. This flow resistance element therefore creates a pressure drop between the brew-water chamber 2 and the valve 20. The magnitude of the pressure drop varies according to the flow rate squared, so higher flow rates result in a higher pressure drop along the conduit.

In FIG. 2C, the flow resistance element 24 is an orifice in the conduit, which is positioned upstream of the valve. This orifice acts as an inertial flow resistor, where a pressure drop occurs as the fluid is accelerated through the narrow orifice, and where the subsequent jet is diffused turbulently. This creates a pressure drop between the brew-water chamber and the valve similarly to the viscous flow resistors in FIGS. 2A and 2B.

The flow resistance element 24 has the effect of reducing the pressure experienced at the valve inlet, so that high flow rates of brew water generate a larger pressure drop, so that the pressure valve moves towards its closed position. This in turn reduces the flow rate of the brew water.

As shown in FIG. 3, when the pressure at the inlet of the pressure valve reaches the valve opening pressure at Time X, the pressure valve opens and allows brew water to start to flow.

From Time X to point CC, the valve allows a regulated flow of brew water to flow into the coffee chamber.

As the coffee chamber fills with water (between Time X and Time Y), the valve establishes an equilibrium state with the valve in a partially open position, so that the valve restricts the flow rate of brew water into the coffee chamber. In this equilibrium state, the position of the valve varies continuously to maintain the pressure at the valve at the valve opening pressure.

The flow resistance element 24 and the valve 20 therefore act in combination to regulate the flow rate of the brew water through the valve while the coffee chamber is filling with brew water. This produces a period of "regulated flow" while the coffee chamber is filling with water, as indicated in FIG. 3. By restricting the flow rate of brew water during this initial stage, the brew water is forced to spend longer in thermal contact with the boiling water 10 in the cooling chamber, which causes it to cool down to the desired temperature.

As the heat source continues to input heat to the brew-water chamber 2 during the regulated flow period, the brew-water pressure during this period continues to increase slightly. Due to the pressure drop created by the flow resistance element 24, however, the valve maintains its equilibrium state with the valve partially open, and counteracts this increase in boiler pressure by restricting the brew water flow rate. This maintains the brew water flow rate to below a maximum flow rate, which in FIG. 3 is illustrated as 4 ml/s.

At point CC, all air has been expelled from the apparatus, and the flow rate is regulated by the ground coffee in the coffee chamber.

Once the coffee chamber 18 is completely filled with water, the source of coffee 22 presents resistance to onward flow of water, so back pressure builds up in the coffee chamber as brew water continues to flow in. The valve 20 is configured so that this back pressure, in addition to the upstream pressure from the brew-water chamber, forces the valve fully open. At this point, the flow rate of the brew water is regulated by the flow resistance of the source of coffee 22, and the flow rate decreases to a steady state flow rate. The steady state flow rate is preferably approximately 1.3 ml/s, which is desirable for brewing espresso coffee.

As the temperature of the brew water 4 is higher than the temperature of the boiling water 10, and the conduit is in thermal contact with the boiling water 10 in the cooling chamber, brew water flowing through the conduit loses heat by conduction to the boiling water. The path of the conduit in the boiling-water cooling chamber is designed to be sufficiently long, and the conduit has sufficiently high thermal conductivity, that brew water flowing through the conduit at the steady state flow rate equilibrates with the temperature of the boiling water. That is, the brew water is cooled until it is at approximately the same temperature as the boiling water in the boiling-water cooling chamber. The brew water is therefore cooled to the second temperature, while maintaining its first pressure. The pressure and temperature of the brew water are thus effectively decoupled.

Any heat absorbed by the boiling water goes into the production of steam, which may be vented from the boiling-water cooling chamber through the cooling-chamber pressure valve. The boiling water 10 therefore remains at the second temperature throughout operation of the coffee-maker.

Line DD: the boiler would have to generate an excess pressure of 2.2 Bar to cause the flow rate to exceed the max allowable flow rate of 4 ml/s. By design, this won't happen in the time frame, when the apparatus is heated on a conventional heat source like a stove-top.

Line EE: Flow rate $\propto \sqrt{(P_{boiler} - P_{valve\ opening})}$

Line FF: operating on this line, the valve is partially open. Operating below this line the valve is fully open.

Figure 4A:
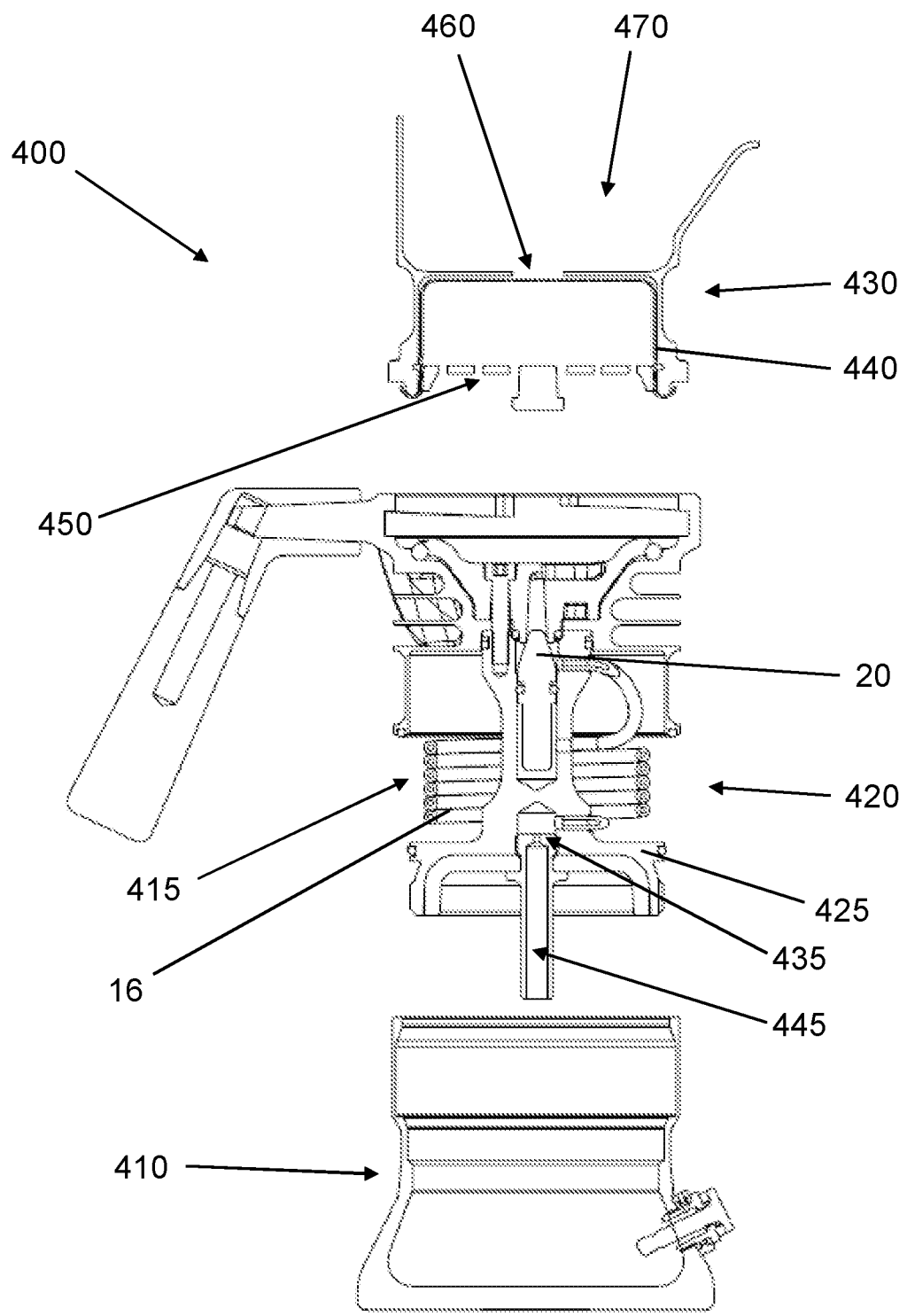
FIG. 4A is an unassembled cross-section view of a preferred embodiment of the coffee-making apparatus according to the first aspect of the invention.
Figure 4B:
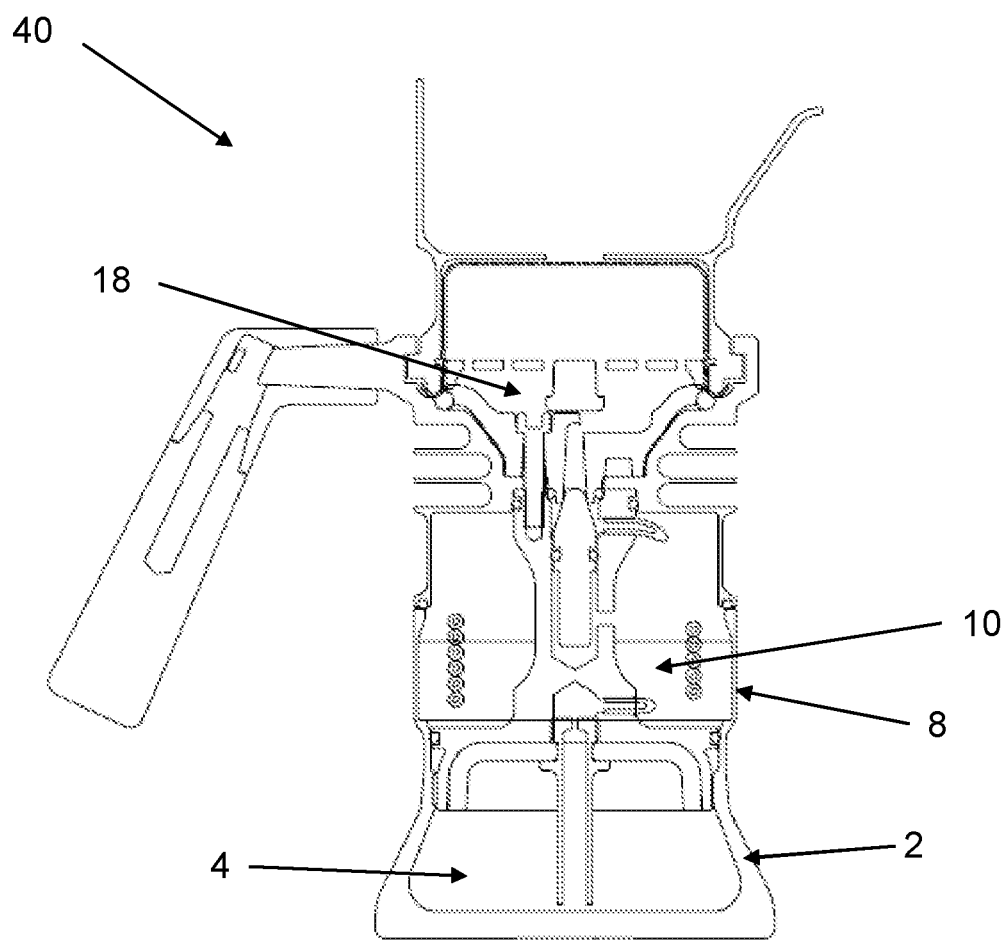
FIG. 4B is an assembled view of the coffee-making apparatus of FIG. 4A.

FIGS. 4A and 4B show a preferred embodiment of the apparatus described above, in which the heat exchanger conduit 16 is configured to act as a viscous flow resistance element. As shown in FIG. 4A, the apparatus 400 is advantageously separable into three parts so that the brew-water chamber 4 and the cooling chamber 8 can be filled with water in a single step, and so that a source of coffee can be placed in the coffee chamber.

A base section 410 of the apparatus 400 is an open-topped container which is filled with water before brewing.

A mid-section 420 of the apparatus 400 contains the water delivery system, which includes the conduit 16, which is configured as a spiral heat exchange coil 415 and the valve 20 positioned at the upper end of the conduit. The boiler-end of the conduit 16 is connected to a widened conduit inlet 445 which has a diameter of 5 mm. The widened conduit inlet is configured to extend into the brew-water chamber to below the surface of the water. A flow-restricting orifice 435 is positioned between the widened conduit inlet 445 and the spiral heat exchange portion of the conduit, so that brew water must flow through the orifice before entering the spiral heat exchange section of the conduit. In this design, the flow-restricting orifice 435 acts as a trap to prevent chunks of limescale entering the narrow spiral section of the conduit.

In a preferred embodiment the spiral section of the conduit 16 has a length of 1056 mm and an internal diameter of 1.35 mm. The length and internal diameter of the conduit also allow the conduit 16 to act as a viscous flow resistance element which creates a pressure drop between the brew-water chamber and the pressure at the valve inlet, the magnitude of which depends on the flow rate of the brew water through the conduit. The pressure drop generated between the brew-water chamber and the valve allows the conduit and the valve to regulate the flow rate of brew water while the coffee chamber is first filling with water.

A partition member 425 is mounted at the bottom of the mid-section, so that when the mid-section 420 is lowered into the base section 410, the partition member 425 forms the ceiling of the brew-water chamber and the floor of the cooling chamber. A domed bottom surface of the partition member captures air when the partition member is lowered into water contained in the base section, so that the mid-section can be, for example, screwed into place part-way down the base-section. Water contained in the base section is then automatically partitioned into brew water below the partition member, and cooling water above the partition member.

An upper section 430 of the apparatus 400 contains an upside-down portafilter 440 and a perforated plate 450 for holding a puck of ground coffee. An outlet 460 above the portafilter leads into a receptacle 470 for brewed coffee.

The mid-section 420 and upper section 430 include mating parts of a bayonet fitting, so that the upper section can be fitted onto the mid-section to form the coffee chamber, which then contains the portafilter and an unoccupied volume of around 15 ml below the perforated plate.

In order to produce the desired pressure drop characteristics to restrict the flow rate during the regulated flow period, but also provide the desired heat exchange capacity, particular lengths and internal diameters of conduit may be selected. A variety of combinations of length and internal diameter are possible while achieving the results sought by the present invention.

Three exemplary conduits have been tested in the apparatus of FIG. 4B, with the results of these tests set out in FIG. 5.

Conduit A has a length of 1056 mm and an internal diameter of 1.35 mm. This was considered to be the best of Conduits A, B and C. It performed well as a heat exchanger coil, with brew water being cooled to below 102° C. even at the maximum acceptable flow rate of 4 ml/s. It also performed well as a flow resistance element, providing a pressure drop of 2.2 bar at 4 ml/s flow rate, and a small pressure drop of ~0.3 Bar at the nominal brewing flow rate of 1.3 ml/s. The length of Conduit A was also not so long that it is too difficult to manufacture for a compact apparatus. The inside diameter was also big enough to ensure that it is not prone to blockage by limescale.

Conduit B has a length of 527 mm and an internal diameter of 1.2 mm. In this design, the pipe was short, and the inside diameter was small. This created desirable pressure drops of ~2.5 Bar at high flow rate, and ~0.3 Bar at nominal flow rate. However, Conduit B did not perform well as a cooling coil—the water exit temperature was too high. As the diameter of the conduit reduces, there is also an increasing risk of blockage by limescale.

Conduit C has a length of 2000 mm and an internal diameter of 1.6 mm. In this design, the pipe was long, and the inside diameter was larger than in Conduits A and B. This creates desirable pressure drops of ~2.5 Bar at high flow rate, and ~0.3 Bar at nominal flow rate. Conduit C performed excellently as a heat exchanger coil, as the brew water had to travel through a long distance of conduit while losing heat to the cooling chamber. The length of the conduit, however, is not conducive to straightforward manufacture, or for use in a compact stove-top apparatus.

Figure 6:
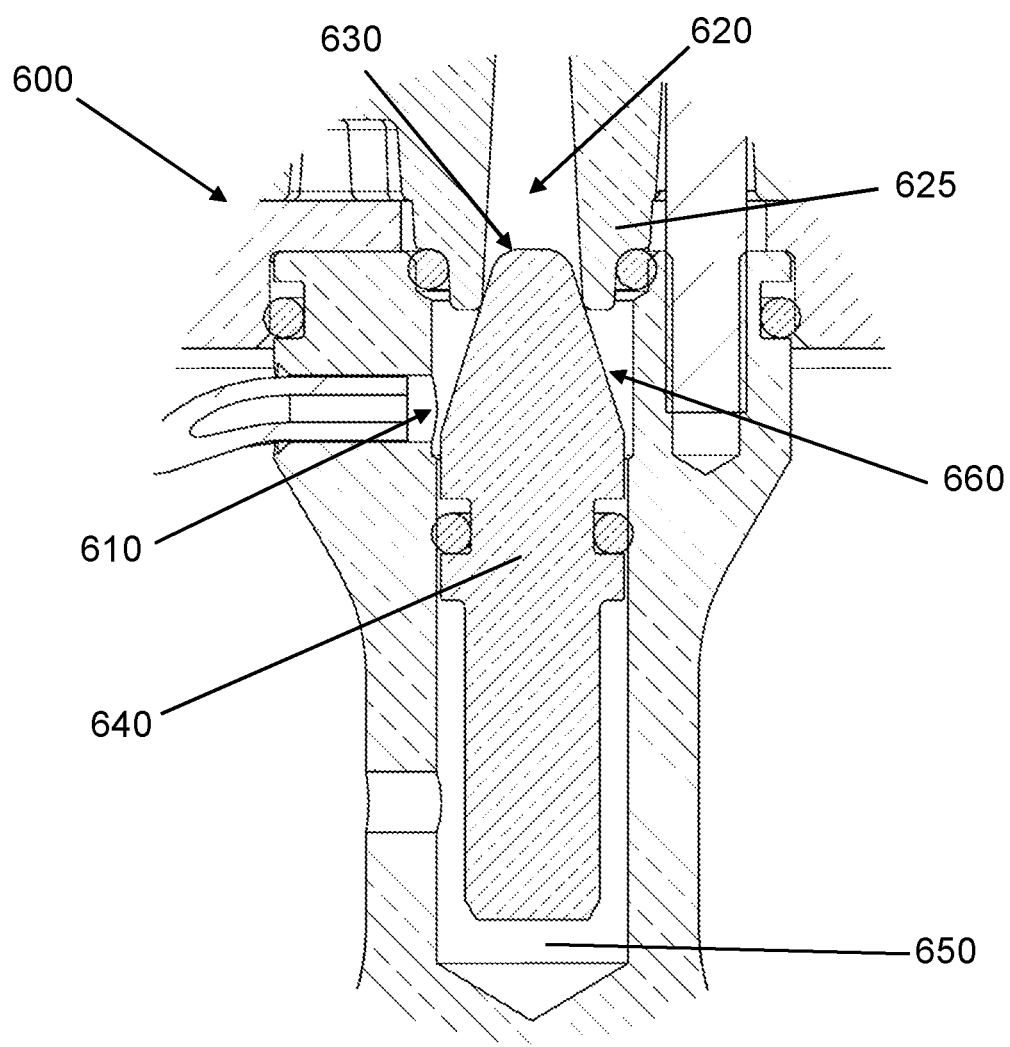
FIG. 6 is a perspective view of a valve according to an aspect of the present invention.
Figure 7A:
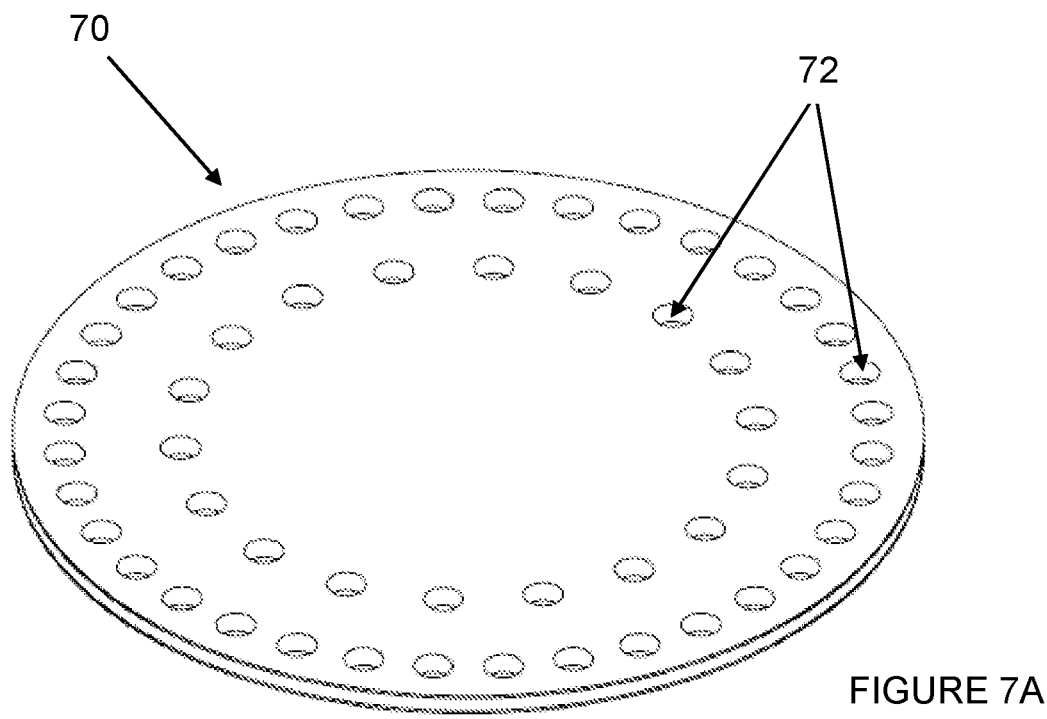
FIG. 7A is a perspective view of an induction hob adapter plate according to an aspect of the present invention.
Figure 7B:
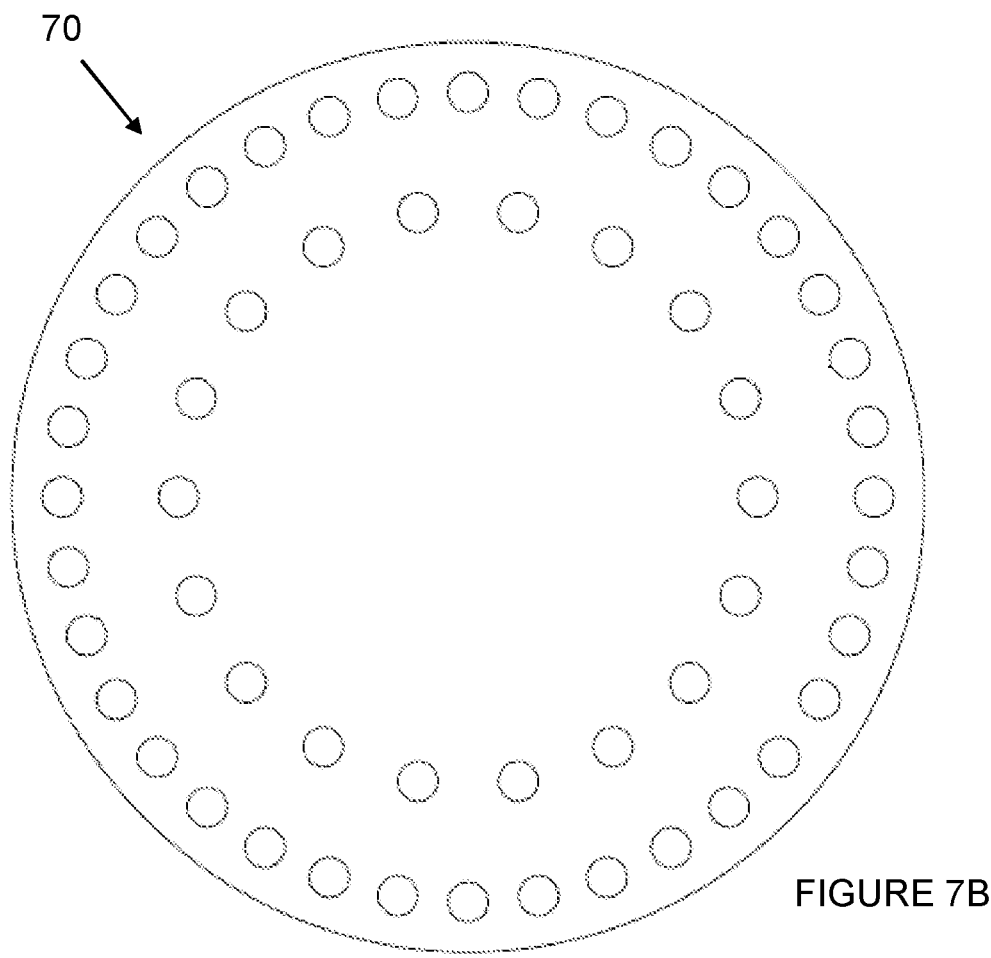
FIG. 7B is a plan view of the adapter plate of FIG. 7A.

FIG. 6 illustrates a valve 600 according to an aspect of the present invention, which is preferably usable in the coffee making apparatus of FIGS. 4A and 4B.

The valve 600 has an inlet 610 which is arranged to receive a flow of liquid, for example brew water from a conduit. An outlet 620, in the form of an aperture in a valve seat 625, is arranged at right angles to the inlet.

In the closed state shown in FIG. 6, the outlet 620 is blocked by the tip 630 of a valve head 640, so liquid cannot flow from the inlet 610 to the outlet 620. The valve head is movable along an axis towards and away from the outlet, so that the valve head moves into a recess 650 as it moves away from the outlet. The area of the recess behind the valve head is open to atmospheric pressure. A spring (not shown) is positioned in the recess 650 so that it biases the valve head towards the outlet 620.

Both the valve head and the valve seat are formed from PTFE.

The valve head 640 comprises a conical portion with a bevelled surface 660 surrounding the tip 630. The angle of the bevelled surface is 17.5 degrees from the normal axis in the preferred embodiment shown.

With the valve in the closed state shown, the bevelled surface 660 is positioned adjacent the inlet 610, so that it presents a first hydraulic area that is acted on by water flowing in through the inlet. Due to the angle of the bevelled surface, water flowing in through the inlet creates an upstream pressure which acts against the valve head and forces it away from the valve seat.

The tip 630 of the valve head is exposed to a downstream pressure in the outlet 620. When there is no liquid at the outlet, the downstream pressure is zero bar gauge pressure.

When the upstream pressure of water flowing into the valve through the inlet reaches a valve opening pressure, which may preferably be 7.5 bar gauge pressure, the upstream pressure balances the biasing force of the spring, so that the valve head moves slightly away from the valve seat, and the valve assumes a partially open state in which some brew water can flow past the valve head to the outlet.

A drop in the upstream pressure acting on the bevelled surface of the valve head will cause the valve to close, while an increase in the pressure at the valve inlet will cause the valve to open further.

As brew water flows through the outlet, a coffee chamber (not shown in FIG. 6) downstream of the valve is filled with water. When the coffee chamber is full, more brew water flowing through the outlet causes the pressure downstream of the outlet to increase. This downstream pressure acts on the tip 630 of the valve head, which forms a second hydraulic area on the valve head, to force the valve head away from the valve seat.

The area of the tip 630 that is exposed to downstream pressure is approximately 30% of the area of the first hydraulic area that is exposed to upstream water flowing in through the inlet.

In this arrangement, both upstream and downstream pressures combine to move the valve head in the same direction, so that the biasing force of the spring is overcome, and the valve head is moved into the recess to a fully open position. The opening of the valve is therefore sensitive to both upstream and downstream pressure. When a flow resistance element is positioned upstream of the inlet 610, the valve advantageously works in combination with the flow resistance element to regulate the flow rate of brew water through the valve until such time as the downstream pressure rises and combines with the upstream pressure to open the valve fully.

FIGS. 7A to 7D illustrate a preferred embodiment of an adapter plate for an induction hob, according to an aspect of the present invention.

In the embodiment shown, the adapter plate 70 is circular in shape and has a diameter of 145 mm. The adapter plate is solid metal, and is formed with a central layer of 2.4 mm-thick 1050 aluminium diffusion bonded between two 0.5 mm-thick layers of 18/0 stainless steel, so that the stainless steel layers form the upper and lower surfaces of the plate.

The adapter plate 70 comprises a first ring of twenty holes 72 which extends around the plate at a radius of 46 mm from the centre of the plate, and a second ring of thirty-six holes which extends around the plate at a radius of 64.5 mm from the centre. All of the holes 72 have a diameter of 6.4 mm. All of the holes 72 extend completely through the plate from the upper surface to the lower surface.

As illustrated in FIG. 8, the adapter plate may be placed between a heat source and a vessel to be heated, for example a coffee-making apparatus as shown.

When the heat source is a flame, for example of a gas stove, the metal adapter plate 70 advantageously spreads and conducts the heat to the vessel. The diameter of the adapter plate advantageously allows it to be positioned on top of conventional pan supports for gas stoves. By using the adapter plate 72, a small-diameter vessel or coffee-making apparatus may therefore be heated over a gas stove when it would not normally balance on the pan support. The inventor has surprisingly found that the use of the holes 72 in the plate increase the efficiency with which a vessel is heated by a flame. This is surprising given the use of holes in heat diffuser plates in the prior art, which are intended to diffuse and reduce heat intensity.

When the heat source is an induction hob, the layers of stainless steel in the adapter plate 72 generate heat in response to the induction hob. The aluminium layer then spreads the generated heat evenly and conducts it to the vessel to be heated. By using the adapter plate 72, a vessel such as a coffee-making apparatus which is not itself induction-compatible may be used on an induction stove.

Preferred Aspects

Preferred aspects of the invention are defined in the following numbered clauses:

1. A coffee-making apparatus, comprising:
   a brew-water chamber for containing heated brew water;
   a coffee chamber;
   a water delivery system for delivering heated brew water from the brew-water chamber to the coffee chamber; and
   a cooling apparatus for cooling the heated brew water before it reaches the coffee chamber;
   in which the water delivery system comprises a conduit and a valve, openable when the pressure at a valve inlet reaches a valve opening pressure, for controlling a flow of brew water into the coffee chamber;
   in which the water delivery system is configured to control the flow rate of brew water while the coffee chamber is filling with brew water.
2. An apparatus according to clause 1, in which the water delivery system is configured to generate a pressure drop between the brew-water chamber and the valve inlet, the magnitude of which depends on the flow rate of brew water through the water delivery system, and in which the valve is configured to vary its position in response to the magnitude of the pressure drop.
3. An apparatus according to clause 1 or 2, in which the water delivery system is configured to control the flow rate of brew water to remain below a maximum flow rate while the coffee chamber is filling with brew water.
4. An apparatus according to clause 3, in which the water delivery system is configured to generate a predetermined threshold pressure drop between the brew-water chamber and the valve when the flow rate of brew water reaches the maximum flow rate, so that at the maximum flow rate the threshold pressure drop makes the valve inlet pressure lower than the valve opening pressure, so that the valve moves towards its closed position to reduce the flow rate of the brew water.
5. An apparatus according to clause 3 or 4, in which the water delivery system is configured to generate a pressure drop of at least 0.5 bar, preferably a pressure drop of at least 1 bar, or 1.25 bar, or 1.5 bar, or 2 bar, between the brew-water chamber and the valve when brew water flows at the maximum flow rate.
6. An apparatus according to clause 3, 4 or 5, in which the water delivery system is configured to control the flow rate of brew water to remain below a predetermined maximum flow rate of 4 ml/s, or 3.5 ml/s, or 3 ml/s, while the coffee chamber is filling with brew water.
7. An apparatus according to any preceding clause, in which the water delivery system is configured to generate a pressure drop of at least 0.5 bar, preferably a pressure drop of at least 1 bar, or 1.25 bar, or 1.5 bar, or 2 bar, between the brew-water chamber and the valve when the flow rate of brew water through the water delivery system is 4 ml/s.
8. An apparatus according to any preceding clause, in which the water delivery system is configured to generate a pressure drop of less than 0.5 bar, preferably less than 0.4 bar, particularly preferably less than 0.3 bar between the brew-water chamber and the pressure valve when brew water flows through the water delivery system at a flow rate of 1.3 ml/s.
9. An apparatus according to any preceding clause, in which the water delivery system is configured to control the flow rate of brew water so that brew water is cooled to a temperature of between 100° C. and 110° C. when it reaches the valve, preferably between 100° C. and 105° C., particularly preferably between 100° C. and 102° C.
10. An apparatus according to any of clauses 2 to 9, in which the length and the internal diameter of the conduit are configured to generate the pressure drop between the brew-water chamber and the pressure valve.
11. An apparatus according to any preceding clause, in which the conduit has a length of between 500 mm and 2500 mm, preferably between 700 mm and 2000 mm, particularly preferably between 800 mm and 1200 mm.
12. An apparatus according to any preceding clause, in which the conduit has a uniform internal diameter of between 1.1 mm and 2 mm, preferably between 1.2 mm and 1.6 mm, particularly preferably between 1.3 mm and 1.4 mm along its length.
13. The apparatus according to any preceding clause, in which the conduit has a length of between 800 mm and 1200 mm, and an internal diameter of between 1.3 mm and 1.4 mm.
14. An apparatus according to any preceding clause, in which the water delivery system comprises a flow resistance element upstream of the valve.
15. An apparatus according to clause 14, in which the flow resistance element comprises a first portion of the conduit having a diameter smaller than the diameter of a second portion of the conduit.
16. An apparatus according to clause 14 or 15, in which the flow resistance element is an inertial flow resistance element configured to generate turbulence in the flow of brew water through the conduit, such as a flow restrictor orifice positioned in the conduit, the flow restrictor orifice having a diameter smaller than the diameter of the rest of the conduit, or a plurality of baffles around which brew water must pass to flow along the conduit.

17. An apparatus according to any preceding clause, in which the valve is configured so that, when the valve opens, the valve controls the flow rate of brew water by varying the position of the valve to maintain the valve inlet pressure at a pressure equal to the valve opening pressure.

18. An apparatus according to any preceding clause, in which the valve is configured to open fully when the coffee chamber is filled with brew water, in response to back pressure acting on the valve.

19. An apparatus according to any preceding clause, in which the valve opening pressure is a pressure below 9 bar, or below 8 bar, for example a pressure between 6 bar and 8 bar, or between 7 bar and 8 bar.

20. An apparatus according to any preceding clause, in which the coffee chamber is configured to contain a source of coffee, a perforated plate upstream of the source of coffee, and an upstream portion of the coffee chamber upstream of the perforated plate for receiving brew water from the valve.

21. An apparatus according to any preceding clause, in which the water delivery system is configured to control the flow rate of brew water so that it takes between 2.5 seconds and 10 seconds for the coffee chamber to be filled with water, or between 3 seconds and 7 seconds, preferably between 4 seconds and 6 seconds.

22. An apparatus according to any preceding clause, in which the cooling apparatus comprises a cooling chamber for containing boiling water, in use, so that the brew water flowing through the water delivery system is cooled by heat flow to boiling water in the cooling chamber.

23. A method of making coffee, comprising the steps of:
    heating brew water contained in a brew-water chamber until it reaches a valve opening pressure, at which a valve opens and brew water flows through a water delivery system to a coffee chamber;
    cooling the brew water by heat flow to a cooling apparatus as it flows through the water delivery system; and
    controlling the flow rate of the brew water while the coffee chamber is filling with water.

24. A method according to clause 23, comprising the step of controlling the flow rate of brew water to remain below a maximum flow rate while the coffee chamber is filling with water.

25. A method according to clause 23 or 24, comprising the step of controlling the flow rate of brew water while the coffee chamber is filling with water so that the brew water cools to a temperature of between 100° C. and 110° C. before it enters the coffee chamber, preferably between 100 C and 105 C, particularly preferably between 100 C and 102 C.

26. A method according to clause 23, 24 or 25, in which the flow rate of the brew water is controlled by varying the position of the valve in response to a pressure drop between the brew-water chamber and the valve.

27. A valve in a coffee-making apparatus, the valve comprising:
    an inlet;
    an outlet; and
    a valve head, which is movable between a closed position, in which the valve head prevents fluid flow from the inlet to the outlet, a partially open position, in which the position of the valve head partially obstructs the flow of fluid from the inlet to the outlet, and a fully open position, in which the valve head does not obstruct the flow of fluid from the inlet to the outlet,
    in which the valve head is biased towards its closed position;
    and in which the valve is configured so that the valve head is openable in response to an upstream pressure acting on a first hydraulic area of the valve head, and in response to a downstream pressure acting on a second hydraulic area of the valve head.

28. A valve according to clause 27, in which the valve comprises a valve seat comprising an aperture which is in fluid communication with either the inlet or the outlet, and in which the valve head is configured to protrude into the aperture and seal against the valve seat when the valve is closed.

29. A valve according to clause 27 or 28, in which the valve head comprises a tip configured to protrude into the aperture, and a bevelled portion surrounding the tip, for sealing against the valve seat.

30. A valve according to clause 27, 28 or 29, in which the tip of the valve head provides one of the first and second hydraulic areas, and the bevelled portion provides the other of the first and second hydraulic areas.

31. A valve according to any of clauses 27 to 30, in which the valve seat and the valve head are formed from PTFE.

32. A valve according to any of clauses 27 to 31, in which the bevelled surface of the valve head has an angle of between 10 and 30 degrees from the normal axis of the valve head, preferably between 15 and 20 degrees from the normal axis, particularly preferably between 16 and 18 degrees from the normal axis.

33. A valve according to any of clauses 27 to 32, in which the position of the valve head is continuously variable between the closed state and the fully open state in response to the flow rate of the water flowing through the inlet.

34. A valve according to any of clauses 27 to 33, in which a rear portion of the valve head is open to atmospheric pressure.

35. A valve according to any of clauses 27 to 34, in which the valve is configured to open at an upstream pressure below 9 bar, or below 8 bar, for example a pressure between 6 bar and 8 bar, or between 7 bar and 8 bar.

36. A valve according to any of clauses 27 to 35, in which the valve is configured to sense pressure downstream of the valve, and to open fully in response to the downstream pressure exceeding a threshold downstream pressure.

37. An adapter plate for an induction hob, comprising:
    an upper surface;
    a lower surface;
    at least one layer of ferrous metal; and
    a plurality of holes extending through the plate between the upper surface and the lower surface.

38. An adapter plate according to clause 37, in which the ferrous metal is iron, cast iron, steel, stainless steel, or carbon steel.

39. An adapter plate according to clause 37 or 38, in which the adapter plate comprises a layer of aluminium positioned between two layers of ferrous metal.

40. An adapter plate according to clause 37, 38 or 39, in which the or each layer of ferritic steel has a thickness of at least 0.05 mm, or 0.25 mm, 0.4 mm, or 0.5 mm, or 0.6 mm.
41. An adapter plate according to any of clauses 37 to 40, in which the adapter plate is circular, and in which the plate comprises a plurality of holes arranged in a ring around the plate at a constant radius from its centre.
42. An adapter plate according to any of clauses 37 to 42, in which the adapter plate is circular, and comprises a plurality of holes arranged in a first ring at a first radius around the centre, and a plurality of holes arranged in a second ring at a second radius around the centre.
43. An adapter plate according to any of clauses 37 to 42, in which the first ring comprises at least 14 holes, preferably at least 18 holes, and in which the second ring comprises at least 20 holes, preferably at least 30 holes.
44. An adapter plate according to any of clauses 37 to 43, in which the first radius is between 40 mm and 50 mm, and in which the second radius is between 60 mm and 70 mm.
45. An adapter plate according to any of clauses 37 to 44, in which the plate comprises a continuous ring of ferritic steel extending around the plate between a radius of 50 mm and 60 mm from the centre of the plate.
46. An adapter plate according to any of clauses 37 to 45, in which the plate is circular and has a diameter of between 130 mm and 160 mm, preferably between 140 mm and 150 mm.
47. An adapter plate according to any of clauses 37 to 46, in which the plate consists of a solid sheet of metal, and in which the plurality of holes extend through the whole thickness of the plate.
48. An adapter plate according to any of clauses 37 to 47, in which the plate is circular and comprises no holes at a radius of less than 40 mm from the centre of the plate.
49. An adapter plate according to any of clauses 37 to 48, in which the upper and lower surfaces are flat for sitting flat against the surface of an induction hob.
50. An adapter plate according to any of clauses 37 to 49, in which, the adapter is configured for use both as an adapter for an induction hob and as an adapter for supporting an item over a gas hob.

The invention claimed is:
1. A coffee-making apparatus, comprising:
a brew-water chamber for containing heated brew water;
a coffee chamber;
a water delivery system for delivering heated brew water from the brew-water chamber to the coffee chamber; and
a cooling apparatus for cooling the heated brew water before it reaches the coffee chamber;
in which the water delivery system comprises a conduit and a valve, openable when the pressure at a valve inlet reaches a valve opening pressure, for controlling a flow of brew water into the coffee chamber;
in which the water delivery system is configured to control the flow rate of brew water while the coffee chamber is filling with brew water, and in which the valve is configured so that, when the valve opens, the valve controls the flow rate of brew water by varying the position of the valve to maintain the valve inlet pressure at a pressure equal to the valve opening pressure.

2. An apparatus according to claim 1, in which the water delivery system is configured to generate a pressure drop between the brew-water chamber and the valve inlet, the magnitude of which depends on the flow rate of brew water through the water delivery system, and in which the valve is configured to vary its position in response to the magnitude of the pressure drop.
3. An apparatus according to claim 2, in which the length and the internal diameter of the conduit are configured to generate the pressure drop between the brew-water chamber and the pressure valve.
4. An apparatus according to claim 1, in which the water delivery system is configured to control the flow rate of brew water to remain below a maximum flow rate while the coffee chamber is filling with brew water.
5. An apparatus according to claim 4, in which the water delivery system is configured to generate a pressure drop of at least 0.5 bar between the brew-water chamber and the valve when brew water flows at the maximum flow rate.
6. An apparatus according to claim 4, in which the water delivery system is configured to control the flow rate of brew water to remain below a predetermined maximum flow rate of 4 ml/s while the coffee chamber is filling with brew water.
7. An apparatus according to claim 1, in which the water delivery system is configured to generate a pressure drop of at least 0.5 bar between the brew-water chamber and the valve when the flow rate of brew water through the water delivery system is 4 ml/s.
8. An apparatus according to claim 1, in which the water delivery system is configured to generate a pressure drop of less than 0.5 bar between the brew-water chamber and the pressure valve when brew water flows through the water delivery system at a flow rate of 1.3 ml/s.
9. An apparatus according to claim 1, in which the water delivery system is configured to control the flow rate of brew water so that brew water is cooled to a temperature of between 100° C. and 110° C. when it reaches the valve.
10. An apparatus according to claim 1, in which the conduit has a length of between 500 mm and 2500 mm and/or in which the conduit has an internal diameter of between 1.1 mm and 2 mm along its length.
11. The apparatus according to claim 1, in which the conduit has a length of between 800 mm and 1200 mm, and an internal diameter of between 1.3 mm and 1.4 mm.
12. An apparatus according to claim 1, in which the water delivery system comprises a flow resistance element upstream of the valve.
13. An apparatus according to claim 12, in which the flow resistance element is a flow restrictor orifice positioned in the conduit, the flow restrictor orifice having a diameter smaller than the diameter of the rest of the conduit, or a plurality of baffles around which brew water must pass to flow along the conduit.
14. An apparatus according to claim 1, in which the valve is configured to open fully when the coffee chamber is filled with brew water, in response to back pressure acting on the valve.
15. An apparatus according to claim 1, in which the valve opening pressure is a pressure between 6 bar and 8 bar.
16. An apparatus according to claim 1, in which the water delivery system is configured to control the flow rate of brew water so that it takes between 2.5 seconds and 10 seconds for the coffee chamber to be filled with water.
17. An apparatus according to claim 1, in which the cooling apparatus comprises a cooling chamber for containing boiling water, in use, so that the brew water flowing through the water delivery system is cooled by heat flow to boiling water in the cooling chamber.

18. A method of making coffee, comprising the steps of:
heating brew water contained in a brew-water chamber until the pressure at a valve inlet of a valve reaches a valve opening pressure, at which the valve opens and brew water flows through a water delivery system to a coffee chamber;
cooling the brew water by heat flow to a cooling apparatus as it flows through the water delivery system; and
controlling the flow rate of the brew water while the coffee chamber is filling with water by varying the position of the valve to maintain the valve inlet pressure at a pressure equal to the valve opening pressure.

19. A method according to claim 18, comprising the step of controlling the flow rate of brew water to remain below a maximum flow rate while the coffee chamber is filling with water, and/or comprising the step of controlling the flow rate of brew water while the coffee chamber is filling with water so that the brew water cools to a temperature of between 100° C. and 110° C. before it enters the coffee chamber.

20. A method according to claim 18, in which the flow rate of the brew water is controlled by varying the position of the valve in response to a pressure drop between the brew-water chamber and the valve.

* * * * *